US011327957B2

(12) United States Patent
Su et al.

(10) Patent No.: US 11,327,957 B2
(45) Date of Patent: May 10, 2022

(54) DATA MODEL FOR EMISSIONS ANALYSIS

(71) Applicant: salesforce.com, inc., San Francisco, CA (US)

(72) Inventors: Shengyuan Su, San Francisco, CA (US); Kevin Vranes, Boulder, CO (US); Mohit Bhasin, Hillsboro, OR (US); Donald Rivard, Burlington, MA (US); Jahnavi Gangula Reddy, San Francisco, CA (US); Elena Migunova, Castro Valley, CA (US); Patrick Flynn, San Francisco, CA (US); Thomas Gonzales, Louisville, CO (US)

(73) Assignee: salesforce.com, inc., San Francisco, CA (US)

( * ) Notice: Subject to any disclaimer, the term of this patent is extended or adjusted under 35 U.S.C. 154(b) by 150 days.

(21) Appl. No.: 16/711,411

(22) Filed: Dec. 11, 2019

(65) Prior Publication Data

US 2021/0182275 A1 Jun. 17, 2021

(51) Int. Cl.
*G06F 16/25* (2019.01)
*G06F 16/23* (2019.01)
*G06F 40/183* (2020.01)

(52) U.S. Cl.
CPC ........ *G06F 16/2379* (2019.01); *G06F 16/252* (2019.01); *G06F 40/183* (2020.01)

(58) Field of Classification Search
None
See application file for complete search history.

(56) References Cited

U.S. PATENT DOCUMENTS 9,892,020 B1 * 2/2018 Ophir ................ G06F 16/24568

OTHER PUBLICATIONS

Derwent Summary for CN 109767050 A 2019, Thomson Reuters, 2 pages.*
Perafan, 7 Things You Should Know About NULL Values Jul. 22, 2019, biztory.com, https://www.biztory.com/blog/2019/07/22/null-values-tips.*
IBM SPSS Missing Values Oct. 15, 2020, IBM, https://www.ibm.com/products/spss-missing-values + View Source.*

* cited by examiner

*Primary Examiner* — Jason G Liao
(74) *Attorney, Agent, or Firm* — Holland & Hart LLP

(57) ABSTRACT

Methods, systems, and devices supporting a data model for emissions analysis are described. Some database systems may store emissions data and support a sustainability application. The sustainability application may display reports that track and analyze data related to carbon emissions. In some cases, underlying data for a report is missing from the database system. The system may support extrapolation techniques to estimate the missing data and aggregate the underlying data—including the extrapolated values—according to a data schema of the database to calculate fields in a report. In some cases, a single data record may be used to generate multiple reports. The system may send one or more results to a user device for display in a user interface (e.g., in one or more dashboards). Additionally or alternatively, the system can display underlying calculations (e.g., report calculations, extrapolation calculations, etc.) in the user interface to support auditing activities.

20 Claims, 12 Drawing Sheets

DATA MODEL FOR EMISSIONS ANALYSIS

FIELD OF TECHNOLOGY

The present disclosure relates generally to database systems and data processing, and more specifically to a data model for emissions analysis.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, the cloud platform—or any other database system—may store data related to sustainability and environmental impacts. However, an organization (e.g., a tenant of a database system) may fail to efficiently collect, manage, and analyze this data. For example, collecting data related to an organization's greenhouse gas emissions footprint (i.e., the organization's carbon emissions) may take several months, preventing the organization from taking timely action on climate change. Additionally, in some cases, the organization may be missing important data, leading to long delays in emissions analysis, inaccurate or incomplete emissions reports, or both. Furthermore, the emissions data analysis—for example, including report generation—may not be transparent, resulting in inefficient auditing and limited insights that can be drawn from the data analysis.

DETAILED DESCRIPTION

Figure 1:
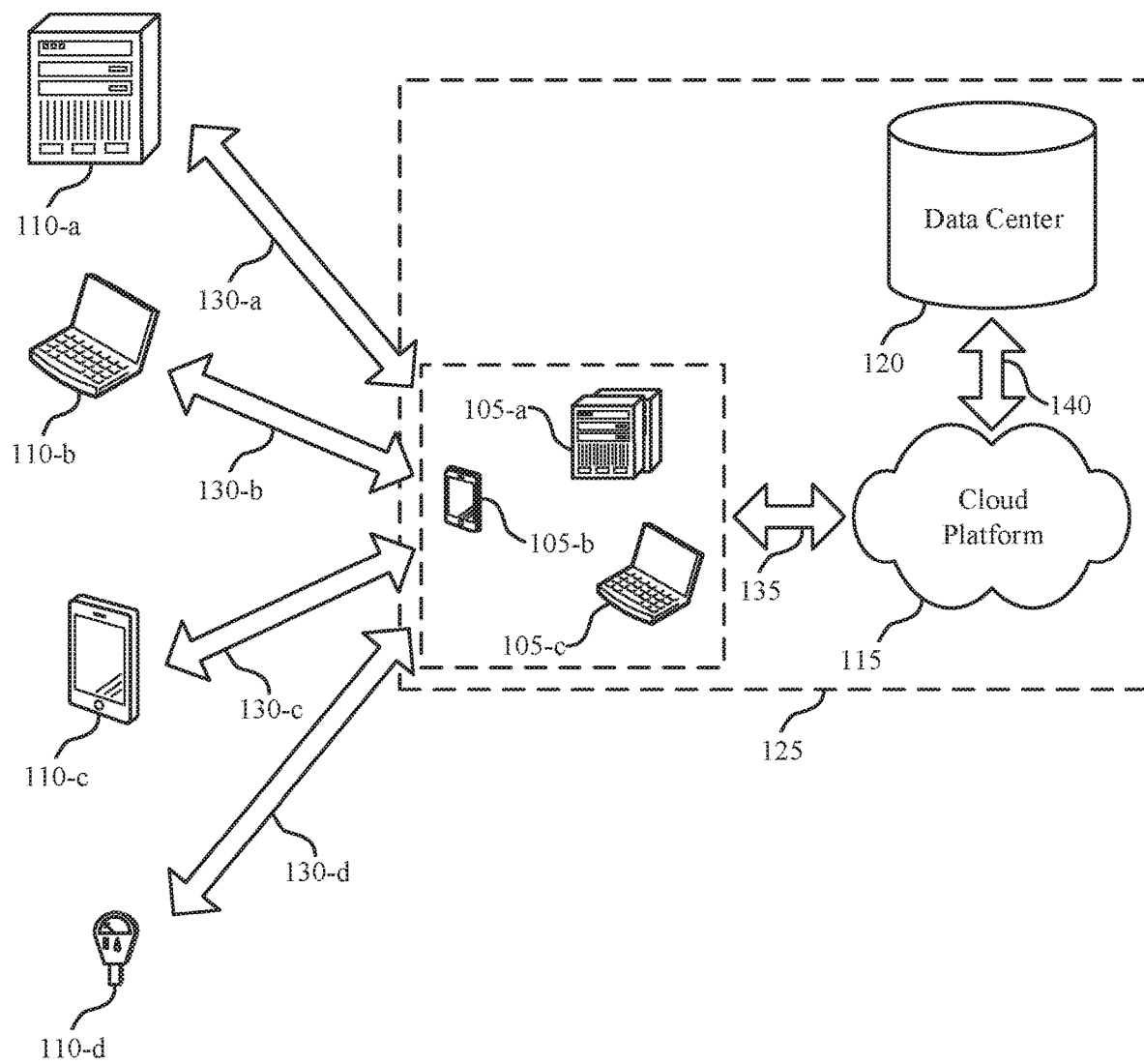
FIGS. 1 and 2 illustrate examples of systems for data analysis that support a data model for emissions analysis in accordance with aspects of the present disclosure.

Some systems, such as customer relationship management (CRM) systems or other data management systems, may store data related to sustainability. For example, a database system may store data records corresponding to an organization's carbon emissions, energy usage, or some combination of these or other data indicating the organization's environmental footprint. In some cases, such data may be difficult to efficiently collect, manage, and/or analyze. For example, collecting emissions data for an organization may take several months, preventing the organization from taking timely actions based on an analysis of the data. Additionally or alternatively, the database system may be missing important data (e.g., for small offices with poor data tracking, etc.), leading to long delays in emissions analysis, inaccurate or incomplete emissions reports, or both. Furthermore, if the emissions data analysis—for example, including report generation—is not transparent, the system may fail to support efficient auditing and powerful, data-driven insights.

To support efficient collection, management, and analysis of emissions data for one or more organizations (e.g., one or more tenants in a multi-tenant database system), a database system may implement a sustainability application built on an underlying data model for emissions analysis. The sustainability application may be integrated with the database for low latency data modification, retrieval, and analysis. In some cases, the sustainability application may implement extrapolation techniques to support data analysis that is robust to gaps in data collection. For example, the database system may store a set of emissions data records (e.g., a first set of data objects) and a set of reports (e.g., a second set of data objects) according to a data schema. In some cases, the database system may identify that at least one value in one of the emissions data records that is relied upon for report generation is missing from the database system. The database system—or the sustainability application running on top of the database system—may generate an estimated value for this missing data based on a user-selected extrapolation function. The database system may automatically include this extrapolated value when aggregating information for the reports. In this way, the reports stored in the database system or created for the sustainability application rely upon the current state of the collected emissions data records, as well as a set of extrapolated values for any data missed during the collection process (or not yet received from the collection process). Such a system may support running accurate analytics (e.g., within a threshold confidence interval) on an organization's environmental impact data prior to completing collection of this data, allowing the organization to quickly address any emissions or allocation concerns.

The data model (e.g., the data schema defining the associations between the data records and reports) may be normalized to prevent duplicate data input. For example, a single data record may be used to generate field values for multiple reports. The database system may automatically update reports stored as part of the data model as new data records enter the system or as updates are made to existing data records in the system. The database system may push these updated records to a user device for display when a user refreshes the sustainability application or based on an update trigger (e.g., a periodic trigger, a real-time trigger, a threshold level of change to a field in a report, or some combination thereof).

The sustainability application may support, at the user device, a user interface including a number of dashboards to display relevant information to a user. The dashboards may display different information to different users (e.g., based on user permissions, user roles, etc.). In some cases, a dashboard may allow a user to drill-down into a reported value, displaying the underlying calculations, data records, or both for analysis. Because the sustainability application is built on top of the database system, the sustainability application may efficiently and securely retrieve this information from a database and cache the information locally at the user device. In some cases, the sustainability application and the underlying data model may provide an organizational schema for data to support one or more business processes. For example, the sustainability application and data model may support auditing activities, resource allocation, credit allocation, or any combination of these or other relevant environmental impact activities.

Aspects of the disclosure are initially described in the context of an environment supporting an on-demand database service. Additional aspects of the disclosure are described with reference to systems, processes, data models, and user interfaces supporting a sustainability application built on an underlying data model for emissions analysis. Aspects of the disclosure are further illustrated by and described with reference to apparatus diagrams, system diagrams, and flowcharts that relate to a data model for emissions analysis.

FIG. 1 illustrates an example of a system 100 for data analysis that supports a data model for emissions analysis in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the system 100 may support a sustainability application. The sustainability application may leverage an underlying data model at the data center 120, the cloud platform 115, or both. For example, the data model may tie together different data object types (e.g., emissions data records, assets, contacts, providers, contracts, reports, etc.) using lookup relationships, parent-child relationships (e.g., master-detail relationships), or other types of relationships between data objects. The data model may allow the data center 120, the cloud platform 115, or both to collect, store, and analyze environmental impact data for one or more organizations. For example, the data model may include report data objects that aggregate information from underlying data records (e.g., in roll-up values, average values, or some combination of these and other metrics). The sustainability application may define a user interface—including one or more dashboards—for displaying these reports at a user device (e.g., a cloud client 105, a contact 110, etc.). In some specific examples, the sustainability application may support external reporting, auditing, executive insights, carbon allocation planning, internal reporting, interpolation, carbon generation tracking, asset management, asset tracking, or any combination of these features.

In other systems, software packages may be used for environmental impact data tracking and analysis. However, these software packages often rely on spreadsheets to perform the analysis. Such spreadsheets may fail to identify and resolve duplicate data. Additionally, these packages may fail to automatically update reports based on changes to the underlying data records. For example, the software packages may export the environmental impact data from a database for analysis (e.g., as a comma-separated values (CSV) file). If the data records are updated in the database, the exported data will not capture these changes, resulting in static and inaccurate analytics. Additionally, these packages may fail to account for missing data. For example, the packages may fail to generate reports based on missing data or may simply skip over missing data values when aggregating information for the reports, resulting in inaccurate calculations. These packages further may not effectively support certain functionality, such as auditing. For example, an auditor may not be able to view the calculations leading to the reported values and may have to inefficiently export a CSV file and look through the data records in the exported file to try to ascertain how the records resulted in the reported values.

In contrast, the system 100 may utilize the underlying data model to support a flexible, dynamic sustainability application. For example, because the reports are tied to the data records within the data model, the field values in the reports may automatically update along with the underlying data records in the database. Furthermore, based on the data schema, the database may identify and resolve duplicate data records, such that updating a single data record in the database may accurately update multiple reports that rely upon that data record. Furthermore, the system 100 may support extrapolation functionality for the data records. The system 100 may extrapolate missing data values to accurately determine reports without waiting for completion of the full environmental impact data collection process. The system 100 may further provide users with options for how to extrapolate the data (e.g., based on previous data for an organization, based on third-party data, or some combination thereof). The system 100 may additionally or alternatively support reporting transparency. For example, the sustainability application may allow a user to view the underlying calculations, underlying data records, underlying data values, or some combination thereof that result in the reported values.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
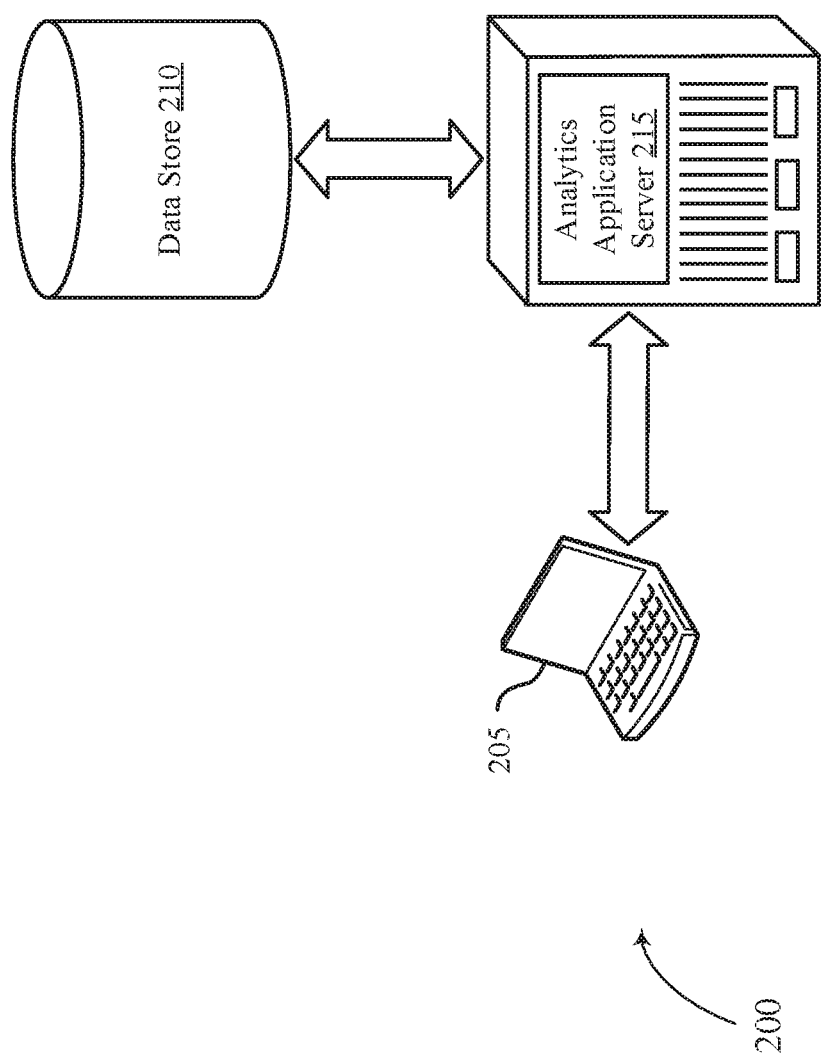

FIG. 2 illustrates an example of a system 200 for data analysis that supports a data model for emissions analysis in accordance with aspects of the present disclosure. The system 200, which may be an example of a system for data processing, includes a user device 205, a data store 210, and an analytics application server 215. The system 200 may implement aspects of the system 100 as described with reference to FIG. 1. For example, the analytics application server 215 may be an example or component of a cloud client 105 (e.g., a server), a cloud platform 115, a data center 120, or some combination thereof. The analytics application server 215 may be an example of a single server, a server cluster, a database server, a cloud-based server, a virtual machine, a container, or any other device or system that supports data processing. Additionally, the user device 205 may be an example of cloud clients 105 or contacts 110, and the data store 210 may implement aspects of one or more of the data center 120 or cloud platform 115 as described with reference to FIG. 1, for example.

The analytics application server 215 may be an example of an analytics platform for creating, reviewing, revising, and analyzing a data model for emissions analysis and may leverage machine learning techniques. The user device 205 may be in communication with the analytics application server 215 and may store and transmit data related to the data model for emissions analysis or data related to the data stored within the data store 210. The user device 205 may present information related to the data model for emissions analysis to a user via a user interface and may solicit input from the user regarding creation, analysis, and updating of the data model for emissions analysis.

A sustainability application leveraging an underlying data model for emissions analysis may allow a user (e.g., an individual, a corporation, or any other entity concerned with emissions associated with their activities) to collect, manage, and analyze data related to their environmental footprint. Collection of a previous year's emissions data may take multiple months and may inhibit efficient actions responsive to undesirable emissions generated by the user or the entities associated with the user's activities. Accordingly, the system 200 may implement a data model for emissions analysis to facilitate compilation and analysis of multiple months of data in real-time or pseudo-real-time.

The analytics application server 215 may implement processes to generate extrapolations for the emissions data input by the user. Data related to greenhouse gases, such as carbon emissions, may be input to the data store 210 by the user device 205 (or another user device or system). In some cases, the data may be input into the database system via the analytics application server 215. In an example, a user may receive a utility bill, and via the user device 205 in communication with the analytics application server 215, may create an energy consumption record that is stored within the data store 210. In another example, a remote device associated with an emissions generating entity, such as an aircraft associated with the user, may be in communication with the analytics application server 215, the data store 210, or both and may automatically transmit usage data to one or both of these entities. The analytics application server 215 or the data store 210 may generate an emissions generation record or energy consumption record for the emissions generating entity and may store the record in the data store 210.

Based on the stored emissions generation records and energy consumption records, among other types of emissions-related data stored within the data store 210, the analytics application server 215 may facilitate multiple analyses of the stored data to facilitate visualization, interpretation, and analysis of the data by the user. These analytic processes by the analytics application server 215 may include carbon generation tracking, carbon generation interpolation and/or extrapolation, carbon allocation planning, generation of internal reports at a granularity desired by the user, cooperation with internal and/or external auditing activities and processes, facilitation of decision making by responsible users, external report generation, or any combination thereof. Additionally, each of the input data records may be available to all components of the system 200 and may be utilized by any portion of the system 200 to generate distinct and disparate reports.

The analytics application server 215 may create or support the data model for emissions analysis based on data that is normalized to inhibit duplication of input data. Additionally or alternatively, the analytics application server 215 may log all interpolations and extrapolations performed using the input data. Such logging of interpolations or extrapolations performed on the input data may facilitate examination of the calculations and assumptions used to generate a given output with respect to the data model and may facilitate efficient auditing of the emissions data. In some cases, the analytics application server 215 may automatically interpolate or extrapolate the input data while displaying (e.g., automatically or upon request) the calculations and factors used to generate the interpolations or extrapolations. In some cases, a report generated by the system 200 may include one or more direct links to factors used during generation of the report. For example, the report may include a link to an emissions factor used to yield the data present in the emissions report, or another similar report. In some cases, all emissions factor data associated with a generated report may be exported for review by an auditor. In such cases, as part of an emissions factor audit, all emissions factor data may be exported and reviewed by the auditor. In other cases, as part of an energy consumption audit, all emissions factor data may be exported or a portion of the emissions factor data may be audited based on a determination of materiality of the data. In some cases, rather than exporting the data for auditing, the sustainability application may provide a user experience specific to an auditor. For example, the user experience (e.g., one or more dashboards) may display information relevant to the auditor without revealing or providing access to confidential records not relevant to the auditor.

The analytics application server 215 may further facilitate auditing of data contained within the data store 210 by facilitating communication between an auditor and a user of the system 200. For example, the auditor may generate questions related to any or all of the stored data and may, via the user device 205, examine data provenance associated with the stored data. Additionally, if the auditor has further questions, they may attach, via the user device 205 interface with the analytics application server 215, questions directly to any portion of the data for which they have further questions. Such a user interface at the user device 205 facilitates an auditor working directly with individual data records and collaboration with a user or users responsible for entering, approving, or managing the data records.

Figure 3:
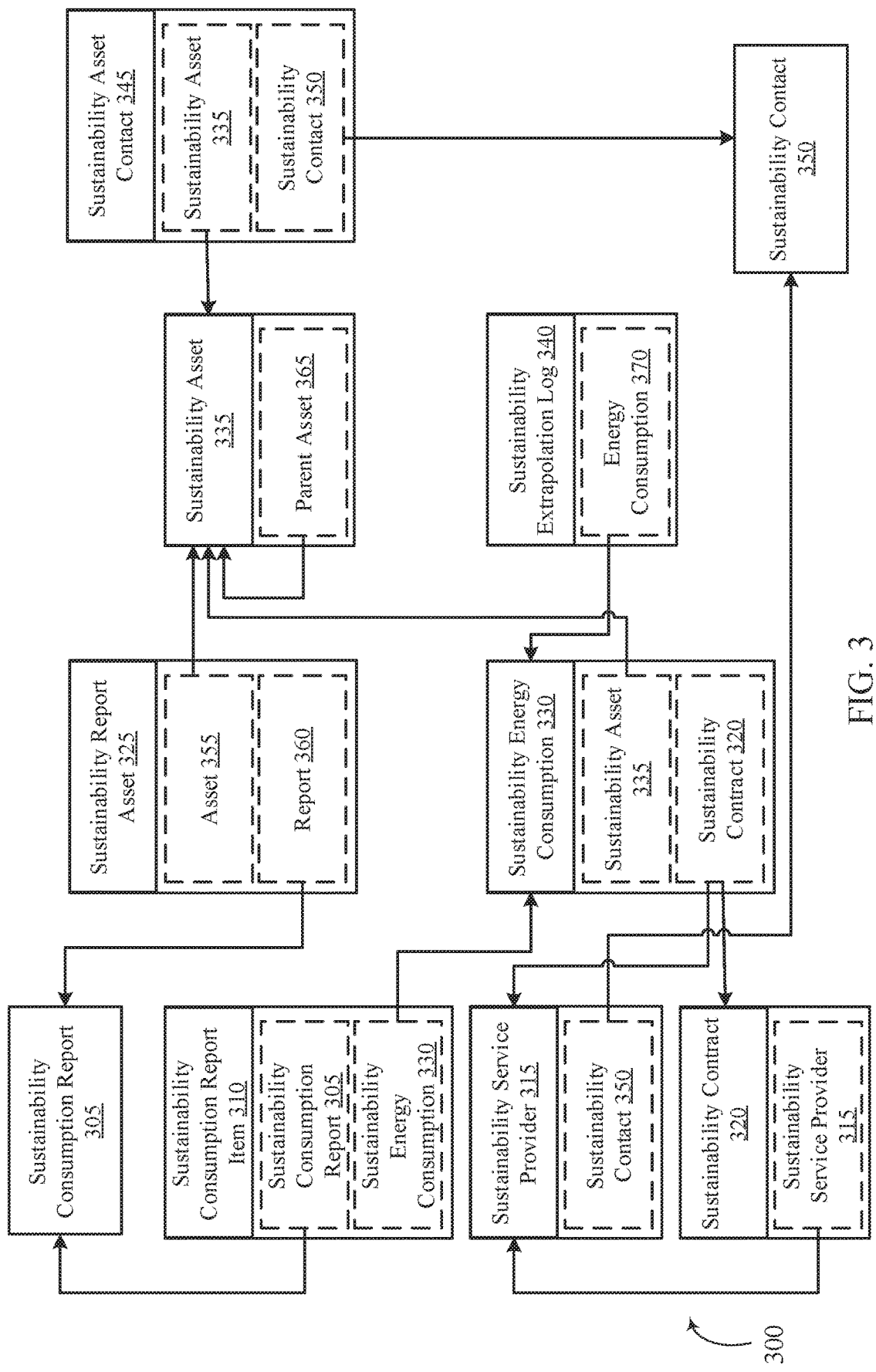
FIG. 3 illustrates an example of a data model that supports emissions analysis in accordance with aspects of the present disclosure.

FIG. 3 illustrates an example of a data model 300 that supports emissions analysis in accordance with aspects of the present disclosure. The data model 300 (e.g., a data schema), which may be an example of at least a portion of a data analysis system, may include multiple data object types. In this example, the data objects (e.g., corresponding to the different data object types) may include a sustainability consumption report 305, a sustainability consumption report item 310, a sustainability service provider 315, a sustainability contract 320, a sustainability report asset 325, a sustainability energy consumption 330, a sustainability asset 335, a sustainability extrapolation log 340, a sustainability asset contact 345, and a sustainability contact 350. FIG. 3 further illustrates how at least a portion of the data objects may be linked together to form the overall data model 300. It is to be understood that the data model 300, as illustrated in FIG. 3 and described herein, is one example data model 300 that may support a sustainability application, and many other data models—with additional or alternative data object types, connections, or both—may support sustainability applications as described herein.

Each of the data objects may include one or more data fields, which may be specific to a data object or may be linked to another data object (e.g., a field in another data object or the other data object itself). For example, the sustainability consumption report item 310 may include a field linked to a sustainability consumption report 305 and a field linked to a sustainability energy consumption 330. These links may be examples of lookup relationships, parent-child relationships (e.g., master-detail relationships), or any other types of relationships. The sustainability service provider 315 may include a field linked to a sustainability contact 350, and the sustainability contract 320 may include a field linked to a sustainability service provider 315. The sustainability report asset 325 may include a field linked to an asset 355 and a field linked to a report 360. The sustainability energy consumption 330 may include a field linked to a sustainability asset 335 and a field linked to a sustainability contract 320. The sustainability asset 335 may include a field linked to a parent asset 365, and the sustainability extrapolation log 340 may include a field linked to an energy consumption 370. The sustainability asset contact 345 may include a field linked to a sustainability asset 335 and a field linked to a sustainability contact 350. One or more of the data objects may additionally include other fields, such as a "created by" field, a "last modified by" field, an owner field, a name field, a contact field, or any other field. Additionally or alternatively, one or more of the data objects may include fields specific to environmental impact information, such as a carbon emissions field, a fuel consumption field, an electrical consumption field, an asset number field, a region field, a grid subregion field, a green building certified field, or any combination of these or other relevant fields. Each field may be a required field for a data object or an optional field for a data object. In some cases, the data model 300 may additionally or alternatively support custom data object types, custom fields, custom links, or a combination thereof.

A database system (e.g., a data center 120, cloud platform 115, or data store 210 as described with reference to FIGS. 1 and 2) may store data according to the data model 300. In this way, the database system may automatically track reporting information for environmental impact data based on the stored data objects and links between the data objects. For example, a sustainability consumption report 305 may automatically aggregate data from a set of sustainability report assets 325, sustainability consumption report items 310, or a combination thereof within the database system. This may reduce the latency involved in generating reports and may keep the reports up-to-date based on the latest data stored in the database system. Additionally, the database system may perform calculations, aggregations, and/or analysis on the stored data records (e.g., based on the data model 300) without exporting any of the data outside the database system (e.g., without exporting a CSV file). Performing these processes internal to the database system may reduce processing latency, improve system security, and support real-time or pseudo-real-time updates.

Furthermore, based on the identifiers used within the database system, the data model 300 may automatically identify and correlate duplicate data records input into the system. For example, a user may input an updated sustainability asset 335 into the system. The system may automatically replace a now out-of-date version of this sustainability asset 335 based on the data model 300 and identifiers for each of these data objects. The database system may provide a sustainability application access to any combination of the data objects in the data model 300 for display in one or more user interfaces (e.g., as described herein with reference to FIG. 5).

Figure 4:
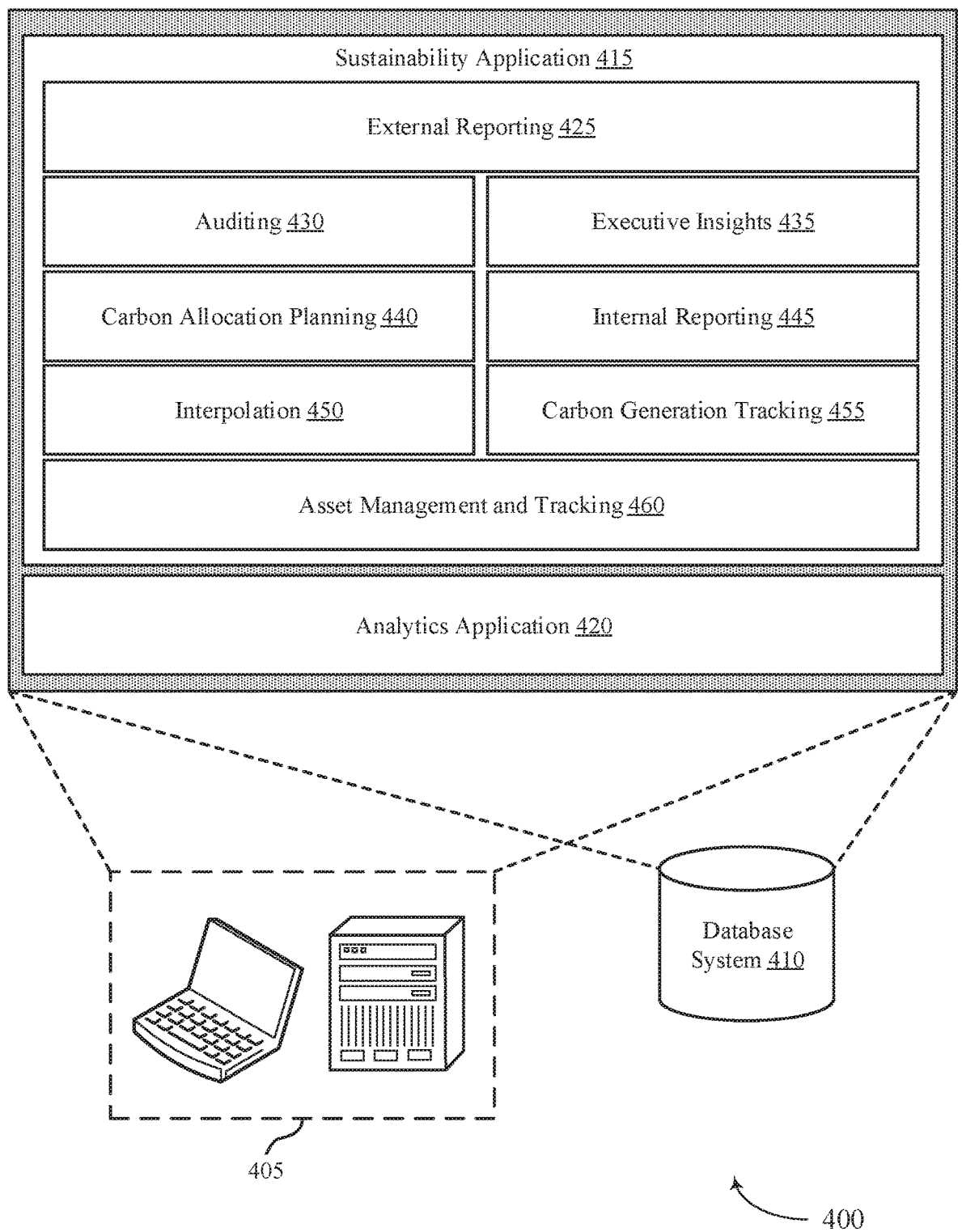
FIG. 4 illustrates an example of a conceptual architecture that supports a data model for emissions analysis in accordance with aspects of the present disclosure.

FIG. 4 illustrates an example of a conceptual architecture 400 that supports a data model for emissions analysis in accordance with aspects of the present disclosure. The conceptual architecture 400 may represent a set of features or components supporting a sustainability application 415. In some cases, the sustainability application 415 may provide a single view that represents a current state of data (e.g., within a data model for emissions analysis) for a user. The sustainability application 415 may display user selections and factors associated with the data model, emissions factors, or any other relevant input or output used for emissions analysis by the user. In some cases, the sustainability application 415 may additionally display data associated with the user selections, data associated with the emissions factors, graphical illustrations of the emissions analysis, or any other data associated with other data objects corresponding to the data model for emissions analysis. As illustrated, the sustainability application 415 may be supported by (e.g., built on top of) an analytics application 420. The sustainability application 415 may run on a same system or device as the analytics application 420 or may interact with the analytics application 420 via an application programming interface (API) or some other connector. The integration between the sustainability application 415 and the analytics application 420 may provide for secure, low latency data processing and updating. For example, the sustainability application 415 may support analysis of a large volume of underlying data records without exporting the large volumes of data records outside of the database system 410. The sustainability application 415 may run on a device 405 (e.g., locally at a user device, at a server, etc.), in the database system 410, or on some combination thereof.

The sustainability application 415 may support creation of, analysis of, and interaction with a data model for emissions analysis as described with reference to FIGS. 1 through 3. In some cases, a user may view and interact with the sustainability application 415 (e.g., via a device 405) to create, update, or understand a data model for emissions analysis or the emissions analysis itself, as well as to interact with various other aspects of the data model. For example, the user may use the sustainability application 415 to visualize options and criteria used as part of an emissions analysis report, plan, or project. In some examples, a user may use the sustainability application 415 to understand a current state of an emissions analysis using the data model. For example, the sustainability application 415 may display data related to an emissions generation of a company aircraft, a company data center, a factory, an office, etc., or the sustainability application 415 may display data related to any number of factors used to extrapolate input data to generate an emissions report.

The sustainability application 415 may include a set of components or features relevant to analyzing emissions and energy usage data. For example, the sustainability application 415 may include components or features for external reporting 425, auditing 430, executive insights 435, carbon allocation planning 440, internal reporting 445, interpolation 450, carbon generation tracking 455, asset management and tracking 460, or any combination of these. In some cases, these components or features may be built on top of one another, allowing one feature to draw on information or analyses from another feature. For example, the feature supporting interpolation 450 may provide values that can be used in calculations, estimations, or the like in any of the other features, such as the features supporting carbon allocation planning 440. In some examples, these features may solicit user input or may display data relevant to an emissions analysis report or plan. In some examples, the sustainability application 415 and the analytics application 420 may include additional features or connections directed to further data and auditing functionality. Additionally, in some examples, the illustrated features may be outputs viewable by the user and linked to data contained within or extrapolated by the system 400.

In some examples, the sustainability application 415 may display (e.g., in a user interface) information that a user has permission to view and may hide (or otherwise not display in the user interface) additional information. For example, the sustainability application 415 may display information related to an emissions analysis based on the data model of input data, but may not display personally identifiable information that may be associated with certain assets or energy consumption occurrences based on a permission level or role associated with a user that is viewing the sustainability application 415 (e.g., in a user interface). The sustainability application 415 may automatically filter the information that may be viewed in each user interface according to the role of the user viewing the user interface. Additionally or alternatively, the sustainability application 415 may support customizable user interfaces for use by the users.

One or more of the fields in the user interface displayed by the sustainability application 415 may be automatically generated (e.g., as part of an analysis or report generation of emissions data based on a data model), while other fields may be specified by a user. For example, a user may input, into a user interface, information relevant to the executive insights 435, a number of factors relevant to the auditing 430, or an amount of carbon allocated to a particular entity under the carbon allocation planning 440. Other fields may be automatically populated based on various organizational or user goals or based on data stored in the data model of the database system 410, the analytics application 420, or a combination thereof. The user may modify one or more of the fields in the user interface and a corresponding emissions analysis output may update in real-time or pseudo-real-time based on the user inputs (e.g., based on efficient connections between the sustainability application 415 and the analytics application 420, based on information locally cached at a device 405, or based on some combination thereof).

In some examples, the sustainability application 415, the analytics application 420, or both may run as cloud-based software or cloud-based solutions. The features (e.g., external reporting 425, auditing 430, executive insights 435, carbon allocation planning 440, internal reporting 445, interpolation 450, carbon generation tracking 455, and asset management and tracking 460) and/or at least some of their various sub-components may be implemented in hardware, software executed by a processor, firmware, or any combination thereof. In some cases, each of these features may be an independent module within the sustainability application 415. The sustainability application 415 may include connectors, APIs, or the like to share information between these features.

Figure 5:
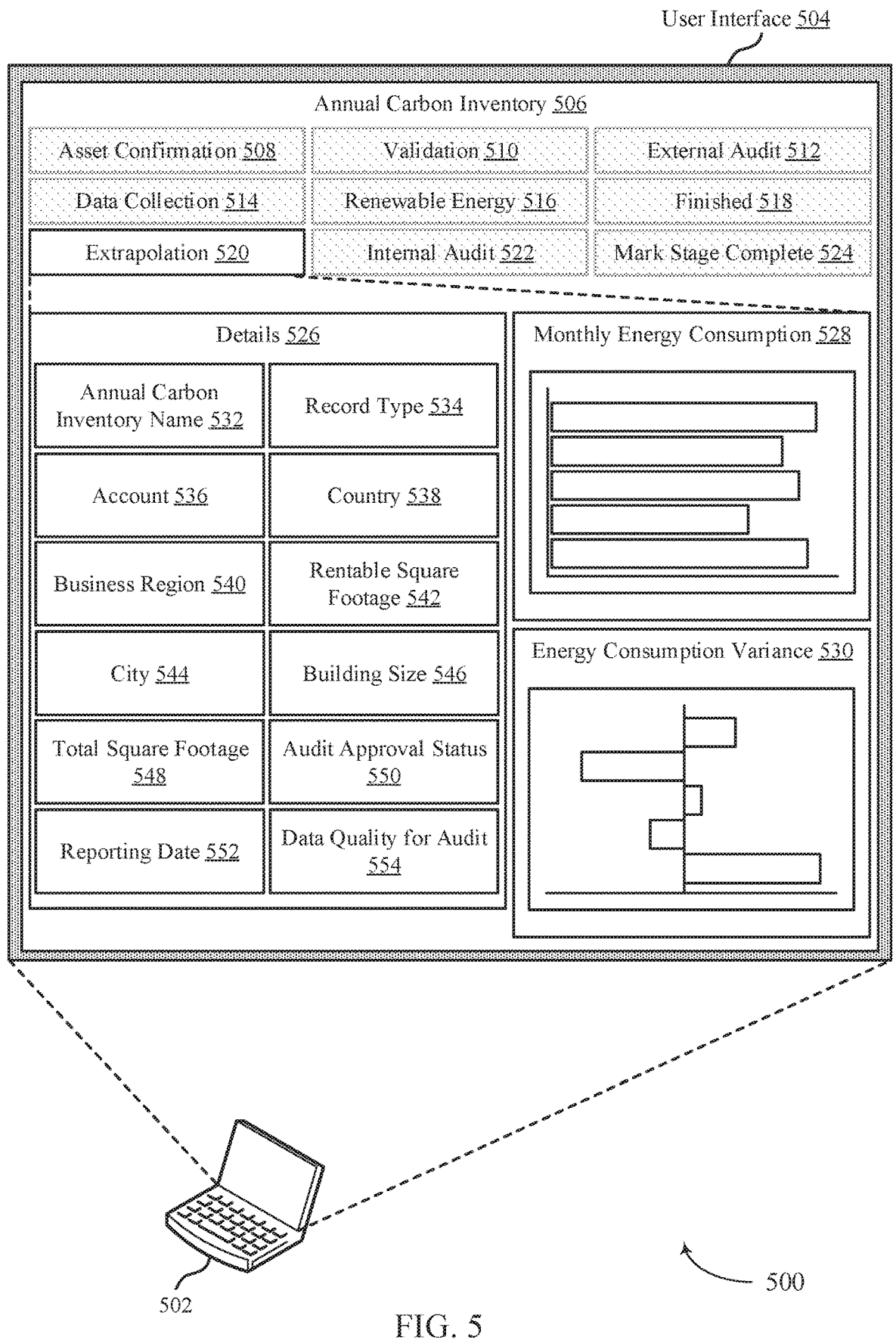
FIG. 5 illustrates an example of a system including a user device with a user interface that supports a data model for emissions analysis in accordance with aspects of the present disclosure.

FIG. 5 illustrates an example of a system 500 including a user device 502 with a user interface 504 that supports a data model for emissions analysis in accordance with aspects of the present disclosure. The system 500 may implement aspects of the system 400 as described with reference to FIG. 4. For example, the user device 502 may be an example of a device 405 running a sustainability application 415 (e.g., locally at the user device 502 or on a backend server, such as a web server, an application server, a cloud-based server, etc.).

The user interface 504 may provide a single view that represents a current state of a user's data (e.g., stored according to a data model for emissions analysis). The user interface 504 may display user selections and factors associated the data model, emissions factors, or any other relevant input or output used for emissions analysis by the user. In some cases, the user interface 504 may additionally display data associated with the user selections, data associated with the emissions factors, graphical illustrations of the emissions analysis, and/or any other data associated with other data objects corresponding to the data model for emissions analysis. As illustrated in FIG. 5, the user interface 504 may include an annual carbon inventory 506 including a number of options such as an asset confirmation 508 option, a validation 510 option, an external audit 512 option, a data collection 514 option, a renewable energy 516 option, a finished 516 option, an extrapolation 520 option, an internal audit 522 option, and a mark stage complete 524 option. However, it is to be understood that the user interface 504 represents an example user interface, and other user interface configurations are supported by the techniques and processes described herein.

The user interface 504 may support creation of, analysis of, and interaction with a data model for emissions analysis as described with reference to FIGS. 1 through 4 and may support cooperation with the sustainability application 415 as described with reference to FIG. 4. In some cases, a user may view and interact with the user interface 504 to create, update, or understand a data model for emissions analysis or the emissions analysis itself, as well as to interact with various other aspects of the data model. For example, the user may use the user interface 504 to visualize options and criteria used as part of an emissions analysis report, plan, or project. In some examples, a user may use the user interface 504 to understand a current state of an emissions analysis using the data model. For example, the user interface 504 may display data related to an emissions generation of a building leased or owned by an entity using the emissions analysis functionality of the system 500 or a number of factors used to extrapolate input data to generate an emissions report.

As illustrated in FIG. 5, the extrapolation 520 option may include a set of outputs relevant to analyzing emissions generation and energy usage data. For example, the extrapolation 520 option may include outputs viewable by the user including details 526, a monthly energy consumption 528, and an energy consumption variance 530. The outputs may display data stored within or generated by the system 500 as part of an extrapolation or interpolation process. In some cases, the extrapolation 520 option of the annual carbon inventory 506 may include any combination of the above referenced outputs. Further, in some cases, the outputs described above may additionally solicit user input as part of the data display or analysis process. In some examples, the extrapolation 520 option and the annual carbon inventory 506 may include additional options or outputs to support further data and auditing functionality.

The details 526 may include a number of outputs corresponding to an emissions generator or energy consumer associated with a set of parameters being analyzed by a user via the user interface 504. These outputs may include an annual carbon inventory name 532, a record type 534, an account 536, a country 538, a business region 540, a rentable square footage 542, a city 544, a building size 546, a total square footage 548, an audit approval status 550, a reporting date 552, and a data quality for audit 554. However, it is to be understood that the details 526 represent example options or outputs within the user interface 504, and other user interface configurations including additional options or outputs are supported by the techniques and processes described herein.

The monthly energy consumption 528 portion of the extrapolation 520 option may include a graphical illustration of energy consumption for an asset or energy consumer associated with the data displayed by the details 526. The graphical illustration may present data stored within the system 500 or extrapolated or interpolated by the system 500. The data may be displayed in the form of a bar chart, as shown, and may be broken into any period of time desired by the user or set by the system 500. In other examples, the values associated with the monthly energy consumption 528 may be displayed in any format that facilitates analysis of the data corresponding to the consumed energy by the user.

The energy consumption variance 530 portion of the extrapolation 520 option includes a graphical illustration of a variance of energy consumption over a predetermined period of time for an asset or energy consumer associated with the data displayed by the details 526. The graphical illustration may present data stored within the system 500 or extrapolated or interpolated by the system 500. The data may be displayed in the form of a bar chart, as shown, and may be broken into any period of time desired by the user or set by the system 500. In other examples, the values associated with the energy consumption variance 530 may be displayed in any format that facilitates analysis of the data corresponding to the consumed energy by the user. In some cases, a user may drill-down into the specifics of the monthly energy consumption 528, the energy consumption variance 530, or both by selecting a particular bar, a portion of a bar, or the like.

As described herein, the user interface 504 may support creation of, analysis of, and interaction with a data model for emissions analysis. In some examples, the user interface 504 may display information that a user has permission to view and may hide (or otherwise not display) additional information. For example, the user interface 502 may display information related to an emissions analysis based on the data model of input data but may not display personally identifiable information that may be associated with certain assets or energy consumption occurrences based on a permission level associated with a user that is viewing the user interface 504. The system 500 may automatically filter the information that may be viewed in each user interface 504 according to the role of the user viewing the user interface 504. Additionally, or alternatively, the system 500 may support customizable user interfaces 504 for use by the users. Within a multi-tenant system, the system 500 may silo the data for each tenant—or otherwise implement security features such that a tenant cannot access data for a different tenant—to comply with security regulations or procedures. Each user may be associated with a tenant, a role, a permissions level, or a combination thereof (e.g., according to the user credentials or user identifier for the user).

One or more of the fields in the user interface 504 may be automatically generated (e.g., as part of an analysis or report generation of emissions data based on a data model), while other fields may be specified by a user. For example, a user may input data relevant to the asset confirmation 508, the validation 510, and the data collection 514 options of the annual carbon inventory 506. The other fields may be automatically populated based on various organizational or user goals or based on data input to the data model of the system 500. The user may modify one or more of the fields in the user interface 504 and a corresponding emissions analysis output may update in real-time—or pseudo-real-time—based on the user inputs.

Figure 6:
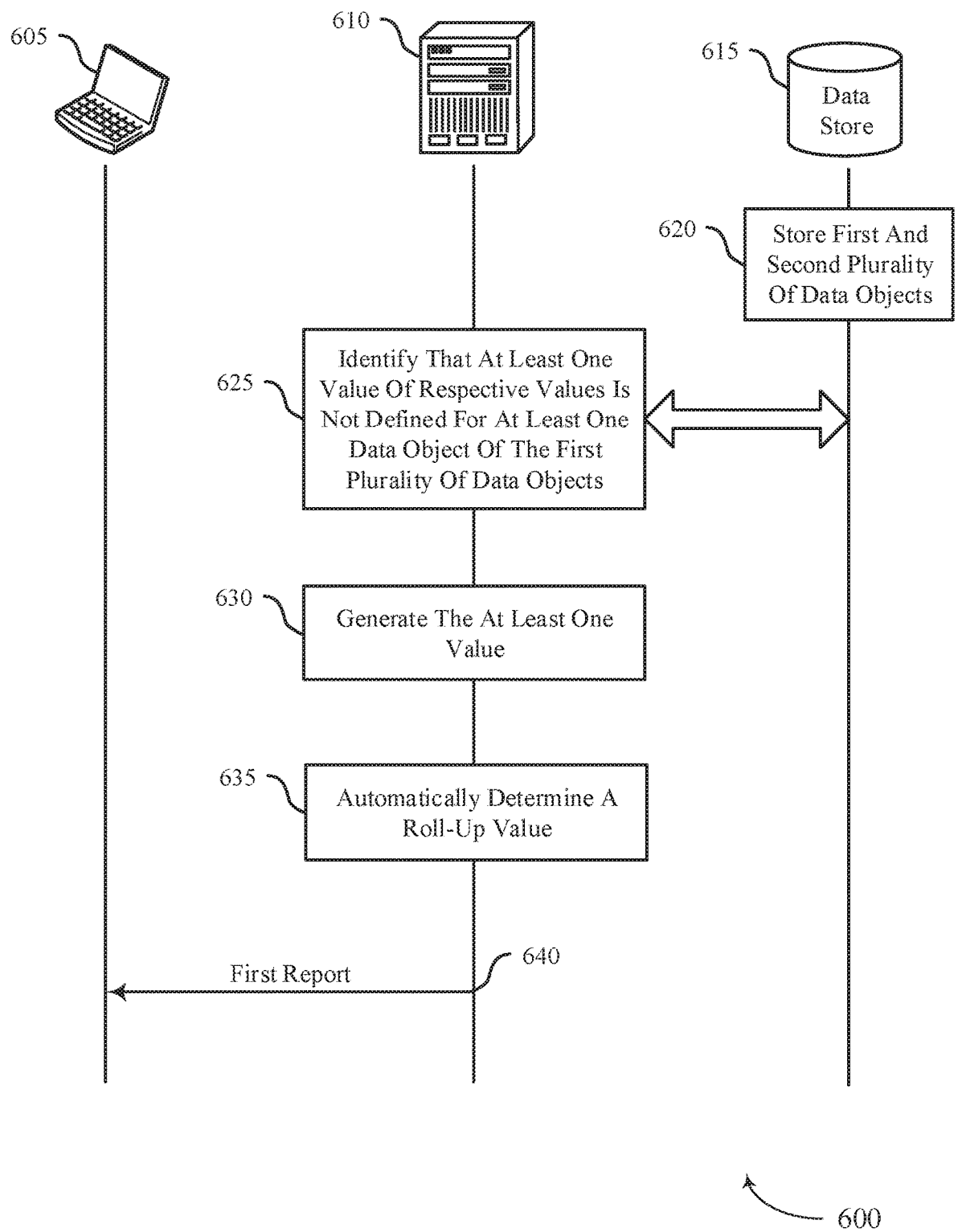
FIG. 6 illustrates an example of a process flow that supports a data model for emissions analysis in accordance with aspects of the present disclosure.

FIG. 6 illustrates an example of a process flow 600 that supports a data model for emissions analysis in accordance with aspects of the present disclosure. The process flow 600 may support functionality or features of a sustainability application. For example, the sustainability application may be built on top of a data management system (e.g., including a data store 615) and may leverage a data model for emissions analysis implemented at the data store 615. The sustainability application may run at an application server 610 (e.g., a single server, a server cluster, a database server, a cloud-based server, a virtual machine, a container, or any other system or device for data processing). In some cases, the functionality described herein with reference to the sustainability application may be performed locally at a user device 605, in the data store 615, or at a combination of these entities. Alternative examples of the following may be implemented, where some steps are performed in a different order than described or are not performed at all. In some cases, steps may include additional features not mentioned below, or further steps may be added.

The data store 615, the application server 610, or both may be components of a database system. At 620, the data store 615 may store a first set of data objects for a tenant of the database system and a second set of data objects corresponding to a set of reports for the tenant. These data objects may be stored according to a data model or data schema of the database system. For example, the data objects may be stored as described with reference to FIG. 3. The reports may be based on information (e.g., values) in the first set of data objects (e.g., data records, such as emissions data records, energy usage data records, asset data records, etc.). For example, a first report of the set of reports may include a roll-up value aggregating respective values of the first set of data objects.

At 625, the sustainability application (e.g., at the application server 610) may identify that at least one value of the respective values is not defined in the database system (e.g., in the data store 615) for at least one data object of the first set of data objects. For example, the database system may perform a collection of environmental impact data for an organization, but the collected data may be incomplete. In some cases, the roll-up function may identify that one or more values upon which the function depends are undefined within the database system and may trigger an extrapolation or interpolation feature supported by the sustainability application, the data store 615, or both.

At 630, the sustainability application (e.g., at the application server 610) may generate the at least one value based on one or more additional data objects and an extrapolation function. In some cases, the extrapolation function may be a default extrapolation function for the database system or the sustainability application. In some other cases, a user may select the extrapolation function. For example, the sustainability application may send, for display in the user interface of the user device 605, multiple indicators indicating a set of supported extrapolation functions. The sustainability application may receive, from the user device 605, a user input indicating a selected extrapolation function from the set of supported extrapolation functions.

The extrapolation function may be a tenant-specific historical extrapolation function, a third-party data extrapolation function, or any other type of extrapolation function. For a tenant-specific extrapolation function, the sustainability application may retrieve, from the data store 615, one or more previously stored data objects for the tenant. In some cases, the tenant-specific extrapolation function may specify a time window for extrapolation (e.g., the previous year, the current year, etc.). For example, the sustainability application may retrieve data objects with timestamps within the time window for data object retrieval. For a third-party data extrapolation function, the sustainability application may determine the at least one value based on information requested from a third-party data source. This information may be a set of environmental impact data records, an industry average value (e.g., for emission intensity), a regional average value (e.g., for emissions intensity), a historical average value, or some other third-party information. In some cases, the sustainability application may implement another type of extrapolation function to estimate one or more missing values in the underlying data records. For example, the extrapolation function may be any extrapolation function using an organization's data with mathematical methods employing linear interpolation.

At 635, the sustainability application (e.g., at the application server 610) may automatically determine the roll-up value according to the data schema based on the respective values of the first set of data objects and the generated at least one value (e.g., the extrapolated values for the missing data). In some cases, the sustainability application may additionally determine a second roll-up value for a second report of the set of reports according to the data schema based on aggregating second respective values of the first set of data objects. Additionally or alternatively, these or other reports may include fields based on aggregating data (e.g., rolling up data, averaging data, merging data, modifying data, etc.) from any number of the data records stored in the data store 615. In this way, multiple reports may be based on a single data object. If the data store 615 receives an additional data object for the tenant or an additional or updated value for a data object of the tenant, the data store 615 may automatically update all of the reports depending on this data object (e.g., according to the data schema).

At 640, the sustainability application (e.g., at the application server 610) may send, for display in a user interface of the user device 605, the first report including the roll-up value. For example, the user device 605 may display one or more fields of the first report in a dashboard. The user interface may support multiple dashboards, multiple user views or experiences (e.g., based on user credentials), or some combination of these. Additionally or alternatively, the user interface may support a user drilling down into a field of the first report. For example, the sustainability application may display underlying calculations for the extrapolation function, underlying calculations for the field, underlying data objects (e.g., emissions conversion data) from the first set of data objects, underlying values from the first set of data objects for the field, or any combination thereof.

The user device 605 may locally cache the first report. In some cases, the first report may be updated in the database system, and the user device 605 may retrieve the updated version to replace the current version stored in the local memory cache. In some examples, the user operating the user device 605 may refresh the local memory cache, and the sustainability application may send the updated first report based on the refreshing. In some other examples, the sustainability application may automatically push the updated first report to the user device 605. For example, the database system may identify an update to the first report and may automatically push the first report based on the update (e.g., to support real-time or pseudo-real-time analytics at the user device 605). In another example, the database system may periodically send updated reports to the user device 605. In yet another example, the database system may send a report if one or more field values in the report change by a threshold amount (e.g., if the sustainability application determines that the report cached locally at the user device 605 is no longer accurate within a threshold level of confidence). Based on one or more of the functions described herein, the sustainability application may support displaying data quality metrics to an auditor. For example, the sustainability application may show change history in a read-only manner to the auditor.

Figure 7:
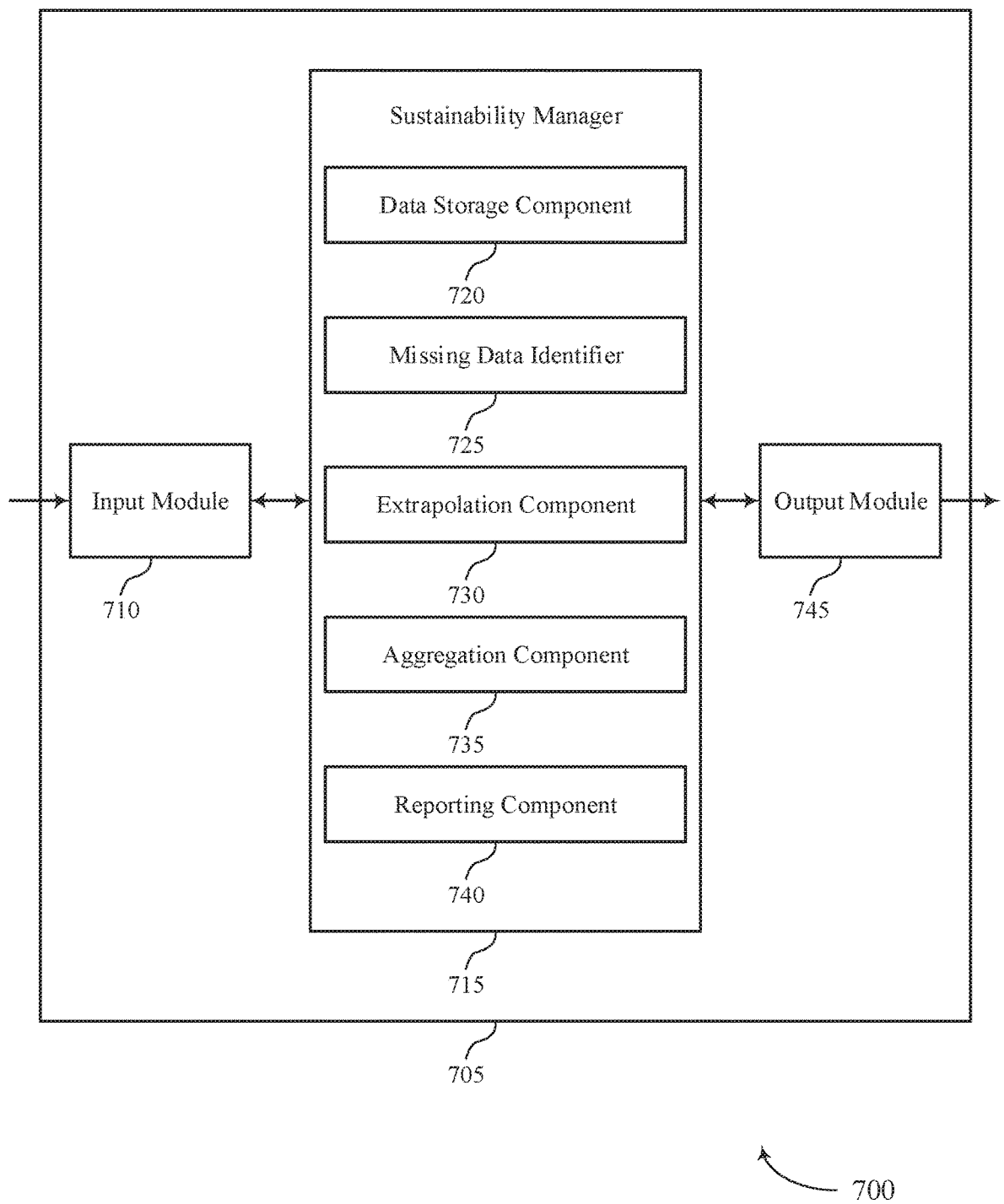
FIG. 7 shows a block diagram of an apparatus that supports a data model for emissions analysis in accordance with aspects of the present disclosure.

FIG. 7 shows a block diagram 700 of an apparatus 705 that supports a data model for emissions analysis in accordance with aspects of the present disclosure. The apparatus 705 may include an input module 710, a sustainability manager 715, and an output module 745. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the sustainability manager 715 to support a data model for emissions analysis. In some cases, the input module 710 may be a component of an input/output (I/O) controller 915 as described with reference to FIG. 9.

The sustainability manager 715 may include a data storage component 720, a missing data identifier 725, an extrapolation component 730, an aggregation component 735, and a reporting component 740. The sustainability manager 715 may be an example of aspects of the sustainability manager 805 or 910 described with reference to FIGS. 8 and 9.

The sustainability manager 715 and/or at least some of its various sub-components may be implemented in hardware, software executed by a processor, firmware, or any combination thereof. If implemented in software executed by a processor, the functions of the sustainability manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The sustainability manager 715 and/or at least some of its various sub-components may be physically located at various positions, including being distributed such that portions of functions are implemented at different physical locations by one or more physical devices. In some examples, the sustainability manager 715 and/or at least some of its various sub-components may be a separate and distinct component in accordance with various aspects of the present disclosure. In other examples, the sustainability manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data storage component 720 may store, in a database system according to a data schema, a first set of data objects for a tenant of the database system and a second set of data objects corresponding to a set of reports for the tenant, where a first report of the set of reports includes a roll-up value aggregating respective values of the first set of data objects.

The missing data identifier 725 may identify that at least one value of the respective values is not defined in the database system for at least one data object of the first set of data objects. The extrapolation component 730 may generate the at least one value based on one or more additional data objects and a user input indicating an extrapolation function. The aggregation component 735 may automatically determine the roll-up value according to the data schema based on the respective values of the first set of data objects and the generated at least one value. The reporting component 740 may send, for display in a user interface, the first report including the roll-up value.

The output module 745 may manage output signals for the apparatus 705. For example, the output module 745 may receive signals from other components of the apparatus 705, such as the sustainability manager 715, and may transmit these signals to other components or devices. In some specific examples, the output module 745 may transmit output signals for display in a user interface, for storage in a database or data store, for further processing at a server or server cluster, or for any other processes at any number of devices or systems. In some cases, the output module 745 may be a component of an I/O controller 915 as described with reference to FIG. 9.

Figure 8:
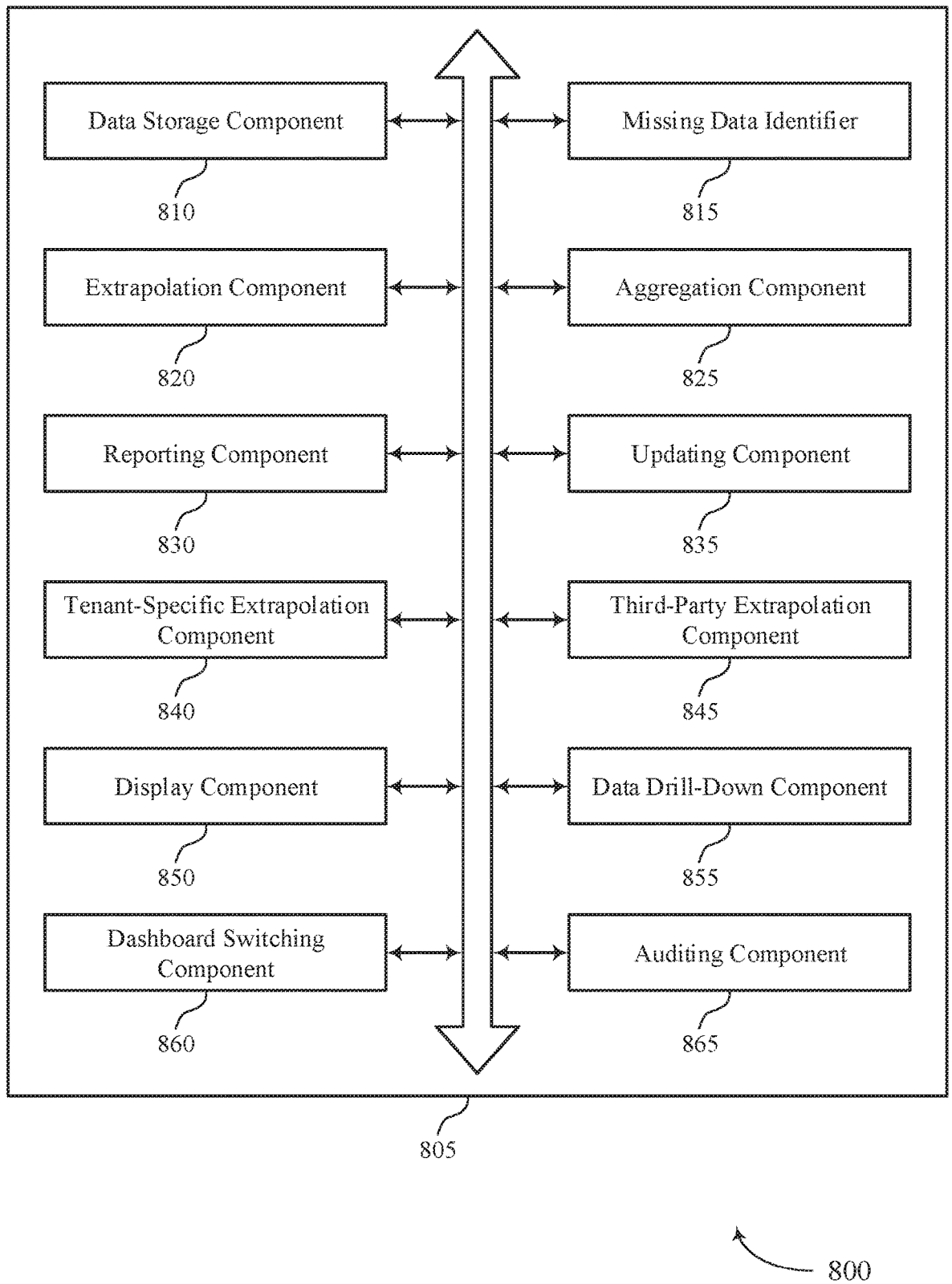
FIG. 8 shows a block diagram of a sustainability manager that supports a data model for emissions analysis in accordance with aspects of the present disclosure.

FIG. 8 shows a block diagram 800 of a sustainability manager 805 that supports a data model for emissions analysis in accordance with aspects of the present disclosure. The sustainability manager 805 may be an example of aspects of a sustainability manager 715 or a sustainability manager 910 described herein. The sustainability manager 805 may include a data storage component 810, a missing data identifier 815, an extrapolation component 820, an aggregation component 825, a reporting component 830, an updating component 835, a tenant-specific extrapolation component 840, a third-party extrapolation component 845, a display component 850, a data drill-down component 855, a dashboard switching component 860, and an auditing component 865. Each of these modules may communicate, directly or indirectly, with one another (e.g., via one or more buses).

The data storage component 810 may store, in a database system according to a data schema, a first set of data objects for a tenant of the database system and a second set of data objects corresponding to a set of reports for the tenant, where a first report of the set of reports includes a roll-up value aggregating respective values of the first set of data objects.

The missing data identifier 815 may identify that at least one value of the respective values is not defined in the database system for at least one data object of the first set of data objects. The extrapolation component 820 may generate the at least one value based on one or more additional data objects and a user input indicating an extrapolation function.

The aggregation component 825 may automatically determine the roll-up value according to the data schema based on the respective values of the first set of data objects and the generated at least one value. The reporting component 830 may send, for display in a user interface, the first report including the roll-up value.

In some examples, the roll-up value is a first roll-up value and the respective values of the first set of data objects are first respective values of the first set of data objects. In some examples, the aggregation component 825 may automatically determine a second roll-up value for a second report of the set of reports different from the first report according to the data schema based on aggregating second respective values of the first set of data objects. The updating component 835 may receive, at the database system, an additional data object for the tenant and may update the first set of data objects to include the additional data object. The updating component 835 may automatically update the first roll-up value for the first report and the second roll-up value for the second report based on the additional data object.

In some examples, the first report is stored in a local memory cache at a user device including the user interface. In some examples, the updating component 835 may receive, at the database system, an additional data object for the tenant, an additional value for a data object of the first set of data objects, or both. The updating component 835 may automatically update, in the database system, the roll-up value for the first report based on the additional data object, the additional value, or both. In some examples, the reporting component 830 may send the first report including the automatically updated roll-up value to the user device for storage in the local memory cache and for display in the user interface.

In some examples, the reporting component 830 may receive, from the user interface, a second user input refreshing the local memory cache, where the first report including the automatically updated roll-up value is sent based on the second user input. In some other cases, the first report including the automatically updated roll-up value is automatically sent based on a real time update procedure, a periodic update procedure, a threshold change to the updated roll-up value, or a combination thereof.

In some examples, the extrapolation function may be a tenant-specific historical extrapolation function. The tenant-specific extrapolation component 840 may retrieve, from the database system, the one or more additional data objects, where the one or more additional data objects include previously stored data objects for the tenant. In some examples, the extrapolation function further includes a time window for data object retrieval and the tenant-specific extrapolation component 840 may retrieve a subset of data objects stored at the database system for the tenant based on a set of timestamps for the subset of data objects and the time window for data object retrieval.

In some other examples, the extrapolation function may be a third-party data extrapolation function. The third-party extrapolation component 845 may determine the at least one value based on the one or more additional data objects from a third-party data source. In some cases, the at least one value includes an industry average value from the third-party data source, a regional average value from the third-party data source, a historical average value from the third-party data source, or a combination thereof.

In some examples, the extrapolation component 820 may generate an initial value for the at least one value based on a default extrapolation function and may receive the user input indicating the extrapolation function, where generating the at least one value includes updating the at least one value from the initial value based on receiving the user input.

In some examples, the display component 850 may send, for display in the user interface, a set of indicators indicating a set of extrapolation functions. In some such examples, the extrapolation component 820 may receive, from the user interface, the user input indicating the extrapolation function from the set of extrapolation functions based on the set of indicators.

In some examples, the display component 850 may send, for display in the user interface, one or more underlying calculations for the extrapolation function, one or more underlying calculations for a field of the first report, or both. In some cases, the user interface displays a subset of fields of the first report based on a user credential.

The data drill-down component 855 may receive, from the user interface, a second user input indicating a drill-down selection into a field of the first report and may send, for display in the user interface, one or more data objects of the first set of data objects based on the drill-down selection.

In some examples, the user interface displays one or more fields of the first report in a first dashboard. The dashboard switching component 860 may receive, from the user interface, a second user input indicating a switch to a second dashboard different from the first dashboard. The dashboard switching component 860 may send, for display in the second dashboard of the user interface, a second report of the set of reports different from the first report based on the second user input.

In some examples, the first report may include a set of data quality metrics. The auditing component 865 may receive, from the user interface, a user credential indicating an auditor, where the first report including the set of data quality metrics is sent for display in the user interface based on the user credential indicating the auditor.

Figure 9:
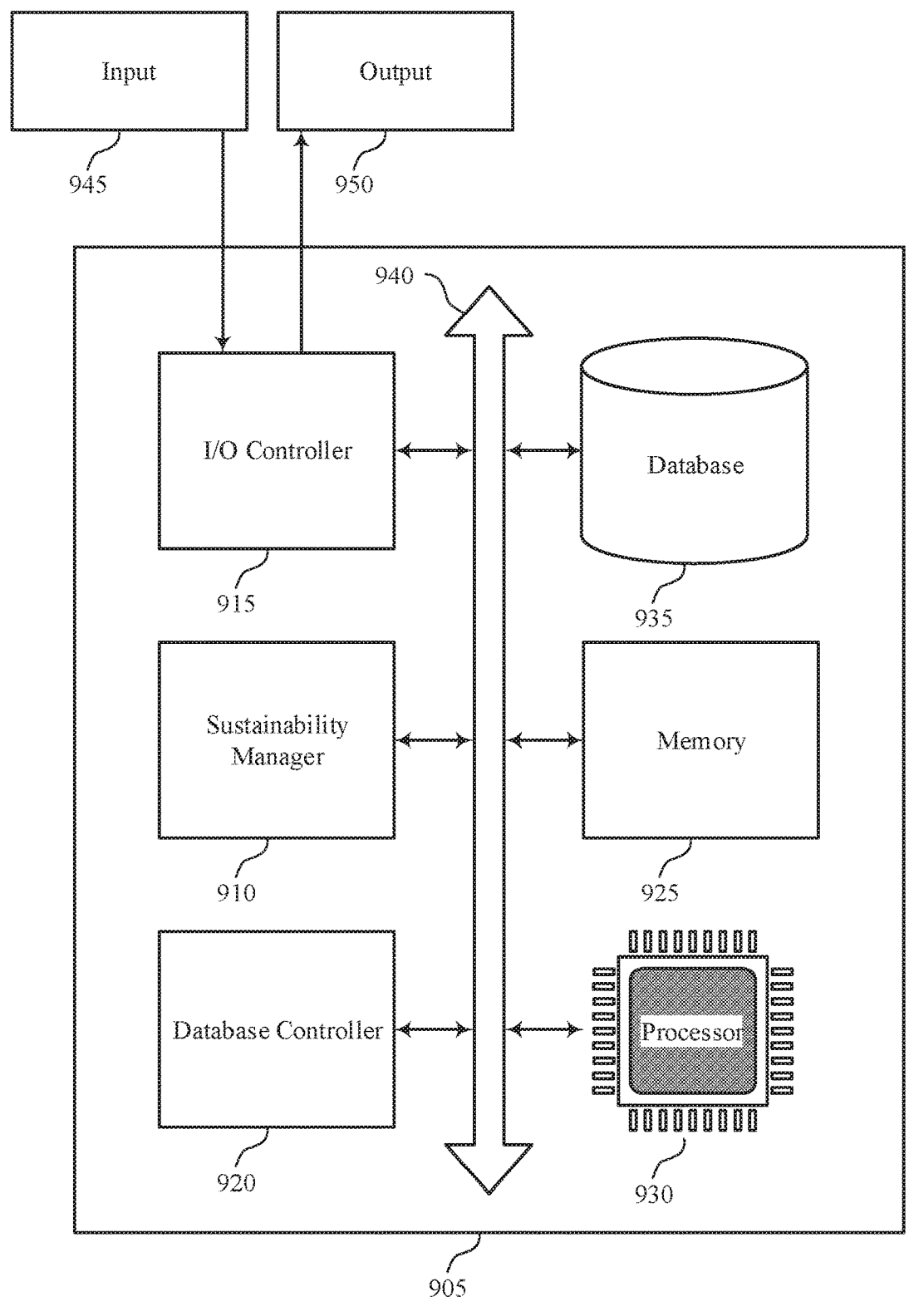
FIG. 9 shows a diagram of a system including a device that supports a data model for emissions analysis in accordance with aspects of the present disclosure.

FIG. 9 shows a diagram of a system 900 including a device 905 that supports a data model for emissions analysis in accordance with aspects of the present disclosure. The device 905 may be an example of or include the components of an application server or an apparatus 705 as described herein. The device 905 may include components for bi-directional data communications including components for transmitting and receiving communications, including a sustainability manager 910, an I/O controller 915, a database controller 920, memory 925, a processor 930, and a database 935. These components may be in electronic communication via one or more buses (e.g., bus 940).

The sustainability manager 910 may be an example of a sustainability manager 715 or 805 as described herein. For example, the sustainability manager 910 may perform any of the methods or processes described above with reference to FIGS. 7 and 8. In some cases, the sustainability manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting a data model for emissions analysis).

Figure 10:
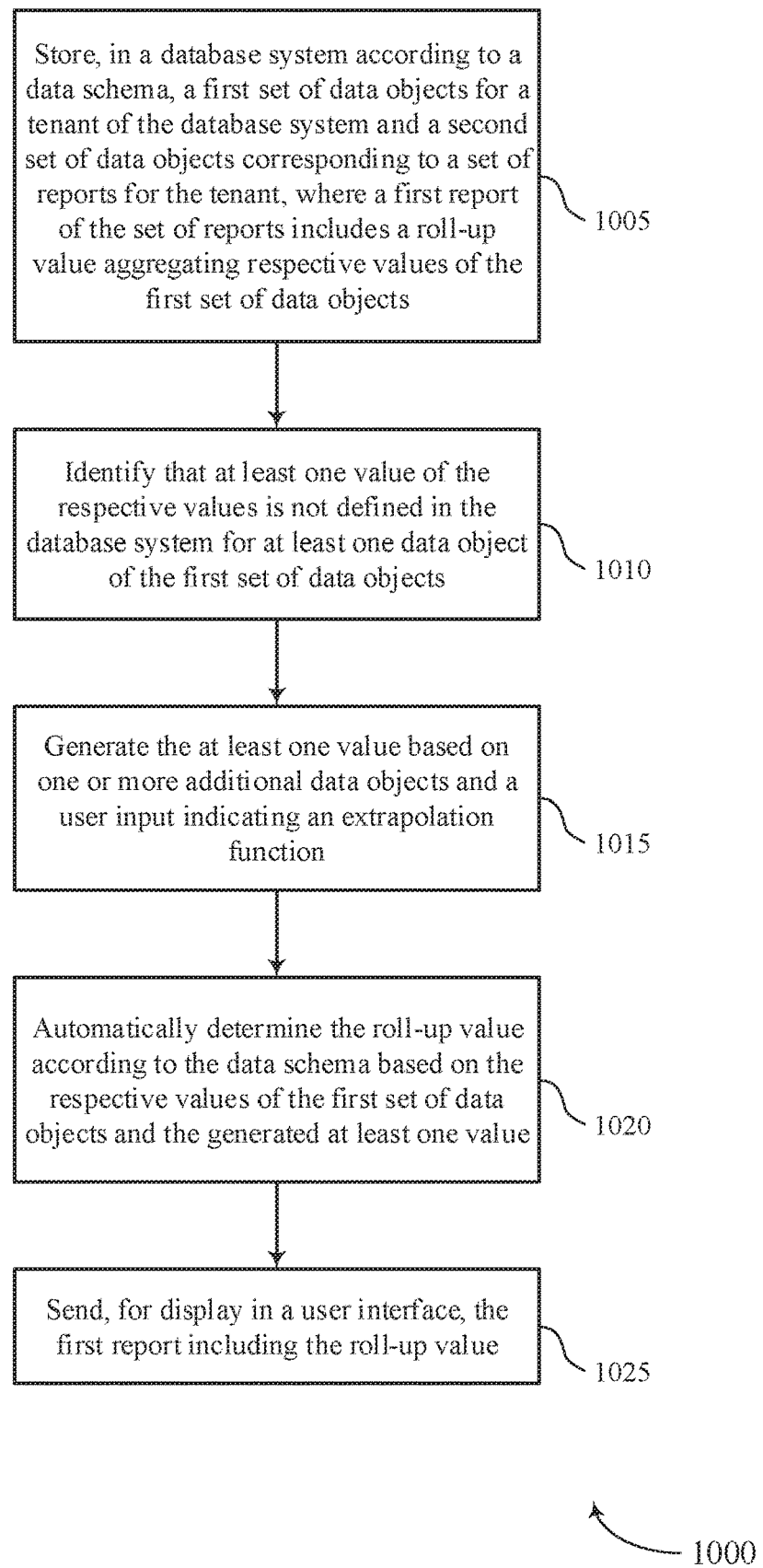
FIGS. 10 through 12 show flowcharts illustrating methods that support a data model for emissions analysis in accordance with aspects of the present disclosure.

FIG. 10 shows a flowchart illustrating a method 1000 that supports a data model for emissions analysis in accordance with aspects of the present disclosure. The operations of method 1000 may be implemented by an application server or its components as described herein. For example, the operations of method 1000 may be performed by a sustainability manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may store, in a database system according to a data schema, a first set of data objects for a tenant of the database system and a second set of data objects corresponding to a set of reports for the tenant, where a first report of the set of reports includes a roll-up value aggregating respective values of the first set of data objects. The operations of 1005 may be performed according to the methods described herein. In some examples, aspects of the operations of 1005 may be performed by a data storage component as described with reference to FIGS. 7 through 9.

At 1010, the application server may identify that at least one value of the respective values is not defined in the database system for at least one data object of the first set of data objects. The operations of 1010 may be performed according to the methods described herein. In some examples, aspects of the operations of 1010 may be performed by a missing data identifier as described with reference to FIGS. 7 through 9.

At 1015, the application server may generate the at least one value based on one or more additional data objects and a user input indicating an extrapolation function. The operations of 1015 may be performed according to the methods described herein. In some examples, aspects of the operations of 1015 may be performed by an extrapolation component as described with reference to FIGS. 7 through 9.

At 1020, the application server may automatically determine the roll-up value according to the data schema based on the respective values of the first set of data objects and the generated at least one value. The operations of 1020 may be performed according to the methods described herein. In some examples, aspects of the operations of 1020 may be performed by an aggregation component as described with reference to FIGS. 7 through 9.

At 1025, the application server may send, for display in a user interface, the first report including the roll-up value. The operations of 1025 may be performed according to the methods described herein. In some examples, aspects of the operations of 1025 may be performed by a reporting component as described with reference to FIGS. 7 through 9.

Figure 11:
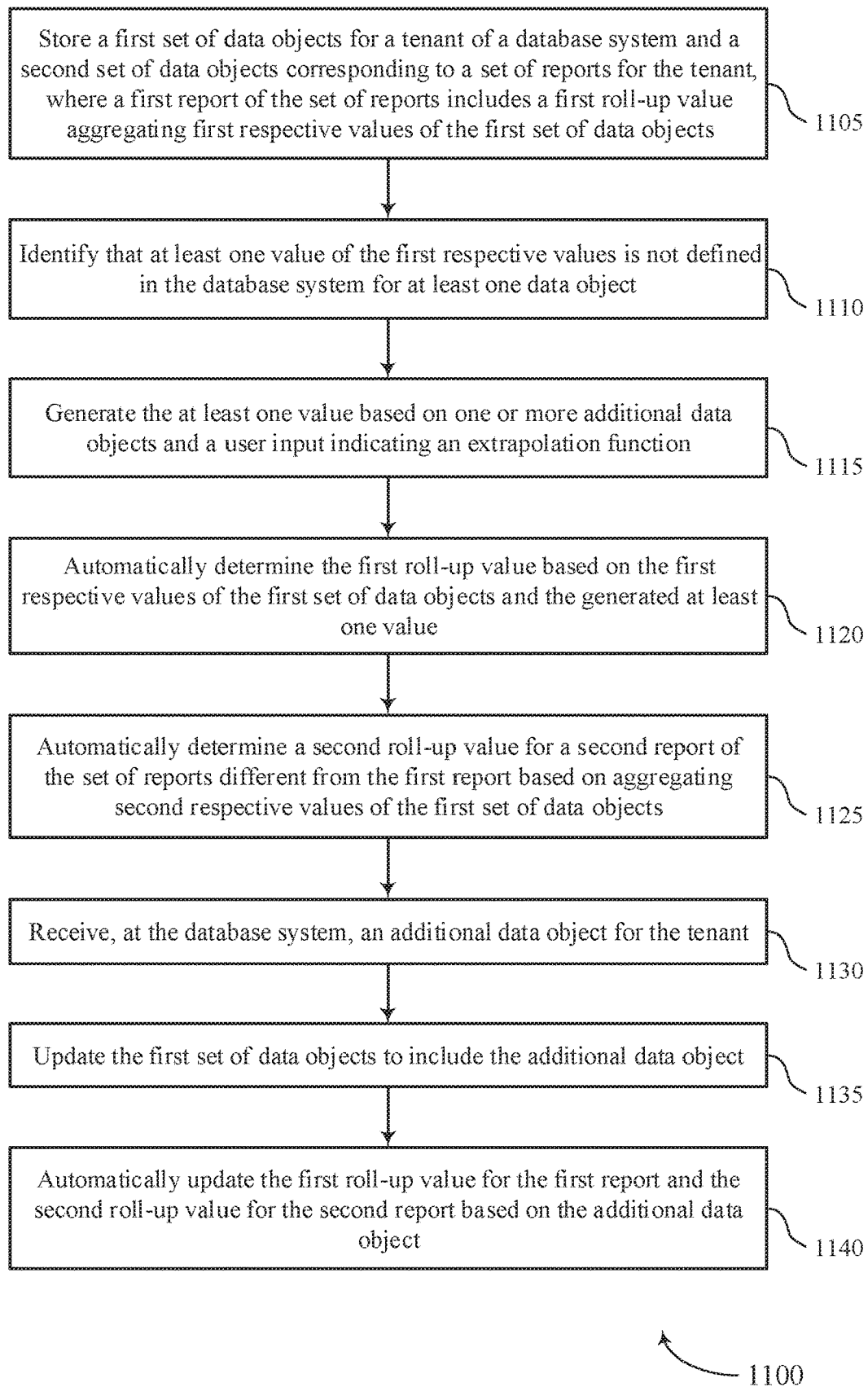

FIG. 11 shows a flowchart illustrating a method 1100 that supports a data model for emissions analysis in accordance with aspects of the present disclosure. The operations of method 1100 may be implemented by an application server or its components as described herein. For example, the operations of method 1100 may be performed by a sustainability manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may store, in a database system according to a data schema, a first set of data objects for a tenant of the database system and a second set of data objects corresponding to a set of reports for the tenant, where a first report of the set of reports includes a first roll-up value aggregating first respective values of the first set of data objects. The operations of 1105 may be performed according to the methods described herein. In some examples, aspects of the operations of 1105 may be performed by a data storage component as described with reference to FIGS. 7 through 9.

At 1110, the application server may identify that at least one value of the first respective values is not defined in the database system for at least one data object of the first set of data objects. The operations of 1110 may be performed according to the methods described herein. In some examples, aspects of the operations of 1110 may be performed by a missing data identifier as described with reference to FIGS. 7 through 9.

At 1115, the application server may generate the at least one value based on one or more additional data objects and a user input indicating an extrapolation function. The operations of 1115 may be performed according to the methods described herein. In some examples, aspects of the operations of 1115 may be performed by an extrapolation component as described with reference to FIGS. 7 through 9.

At 1120, the application server may automatically determine the first roll-up value according to the data schema based on the first respective values of the first set of data objects and the generated at least one value. The operations of 1120 may be performed according to the methods described herein. In some examples, aspects of the operations of 1120 may be performed by an aggregation component as described with reference to FIGS. 7 through 9.

At 1125, the application server may automatically determine a second roll-up value for a second report of the set of reports different from the first report according to the data schema based on aggregating second respective values of the first set of data objects. The operations of 1125 may be performed according to the methods described herein. In some examples, aspects of the operations of 1125 may be performed by an aggregation component as described with reference to FIGS. 7 through 9.

At 1130, the application server may receive, at the database system, an additional data object for the tenant. The operations of 1130 may be performed according to the methods described herein. In some examples, aspects of the operations of 1130 may be performed by an updating component as described with reference to FIGS. 7 through 9.

At 1135, the application server may update the first set of data objects to include the additional data object. The operations of 1135 may be performed according to the methods described herein. In some examples, aspects of the operations of 1135 may be performed by an updating component as described with reference to FIGS. 7 through 9.

At 1140, the application server may automatically update the first roll-up value for the first report and the second roll-up value for the second report based on the additional data object. The operations of 1140 may be performed according to the methods described herein. In some examples, aspects of the operations of 1140 may be performed by an updating component as described with reference to FIGS. 7 through 9.

Figure 12:
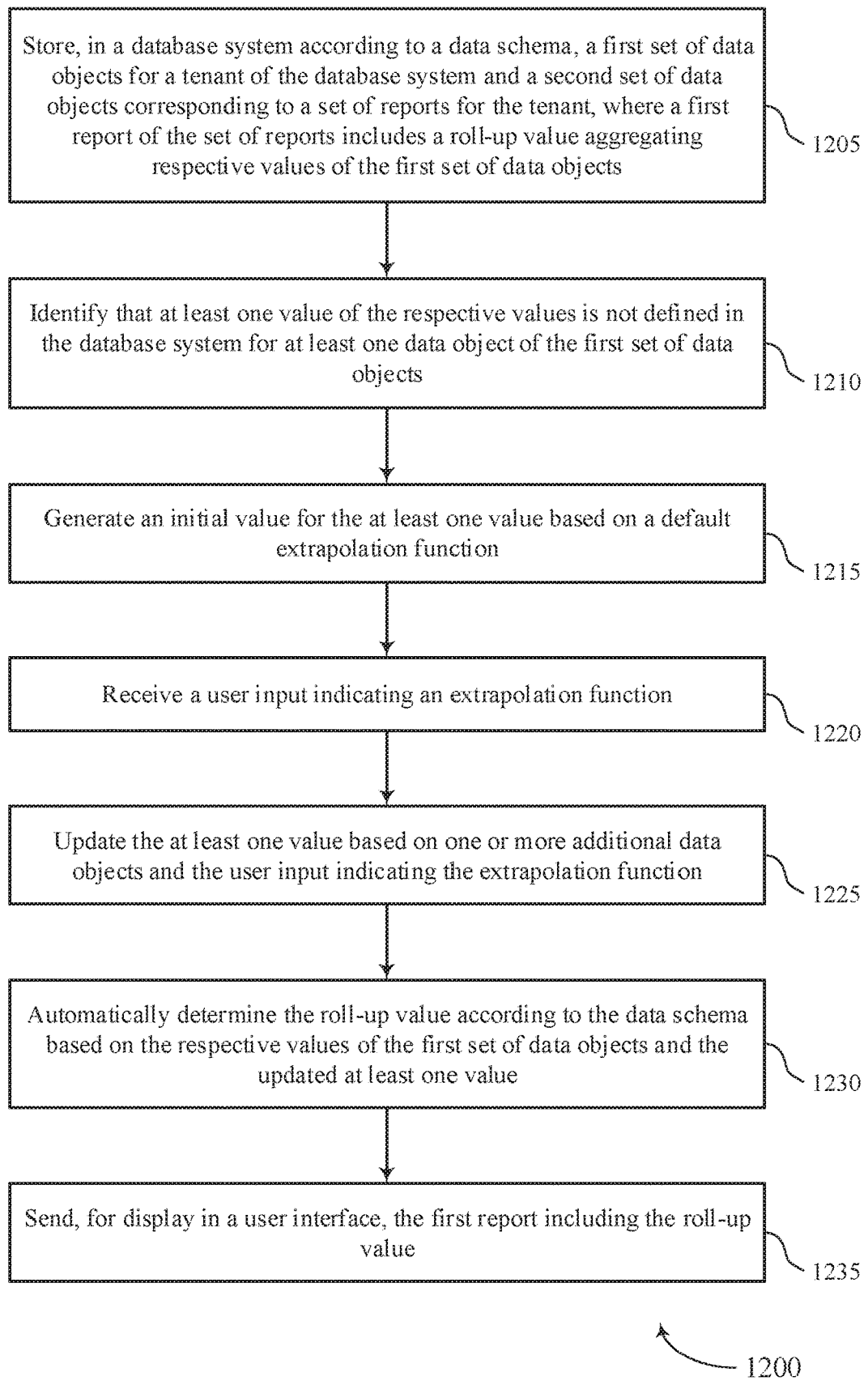

FIG. 12 shows a flowchart illustrating a method 1200 that supports a data model for emissions analysis in accordance with aspects of the present disclosure. The operations of method 1200 may be implemented by an application server or its components as described herein. For example, the operations of method 1200 may be performed by a sustainability manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may store, in a database system according to a data schema, a first set of data objects for a tenant of the database system and a second set of data objects corresponding to a set of reports for the tenant, where a first report of the set of reports includes a roll-up value aggregating respective values of the first set of data objects. The operations of 1205 may be performed according to the methods described herein. In some examples, aspects of the operations of 1205 may be performed by a data storage component as described with reference to FIGS. 7 through 9.

At 1210, the application server may identify that at least one value of the respective values is not defined in the database system for at least one data object of the first set of data objects. The operations of 1210 may be performed according to the methods described herein. In some examples, aspects of the operations of 1210 may be performed by a missing data identifier as described with reference to FIGS. 7 through 9.

At 1215, the application server may generate an initial value for the at least one value based on a default extrapolation function. The operations of 1215 may be performed according to the methods described herein. In some examples, aspects of the operations of 1215 may be performed by an extrapolation component as described with reference to FIGS. 7 through 9.

At 1220, the application server may receive a user input indicating an extrapolation function. The operations of 1220 may be performed according to the methods described herein. In some examples, aspects of the operations of 1220 may be performed by an extrapolation component as described with reference to FIGS. 7 through 9.

At 1225, the application server may update the at least one value based on one or more additional data objects and the user input indicating the extrapolation function. The operations of 1225 may be performed according to the methods described herein. In some examples, aspects of the operations of 1225 may be performed by an extrapolation component as described with reference to FIGS. 7 through 9.

At 1230, the application server may automatically determine the roll-up value according to the data schema based on the respective values of the first set of data objects and the generated at least one value. The operations of 1230 may be performed according to the methods described herein. In some examples, aspects of the operations of 1230 may be performed by an aggregation component as described with reference to FIGS. 7 through 9.

At 1235, the application server may send, for display in a user interface, the first report including the roll-up value. The operations of 1235 may be performed according to the methods described herein. In some examples, aspects of the operations of 1235 may be performed by a reporting component as described with reference to FIGS. 7 through 9.

A method for data analysis is described. The method may include storing, in a database system according to a data schema, a first set of data objects for a tenant of the database system and a second set of data objects corresponding to a set of reports for the tenant, where a first report of the set of reports includes a roll-up value aggregating respective values of the first set of data objects, identifying that at least one value of the respective values is not defined in the database system for at least one data object of the first set of data objects, generating the at least one value based on one or more additional data objects and a user input indicating an extrapolation function, automatically determining the roll-up value according to the data schema based on the respective values of the first set of data objects and the generated at least one value, and sending, for display in a user interface, the first report including the roll-up value.

An apparatus for data analysis is described. The apparatus may include a processor, memory coupled with the processor, and instructions stored in the memory. The instructions may be executable by the processor to cause the apparatus to store, in a database system according to a data schema, a first set of data objects for a tenant of the database system and a second set of data objects corresponding to a set of reports for the tenant, where a first report of the set of reports includes a roll-up value aggregating respective values of the first set of data objects, identify that at least one value of the respective values is not defined in the database system for at least one data object of the first set of data objects, generate the at least one value based on one or more additional data objects and a user input indicating an extrapolation function, automatically determine the roll-up value according to the data schema based on the respective values of the first set of data objects and the generated at least one value, and send, for display in a user interface, the first report including the roll-up value.

Another apparatus for data analysis is described. The apparatus may include means for storing, in a database system according to a data schema, a first set of data objects for a tenant of the database system and a second set of data objects corresponding to a set of reports for the tenant, where a first report of the set of reports includes a roll-up value aggregating respective values of the first set of data objects, identifying that at least one value of the respective values is not defined in the database system for at least one data object of the first set of data objects, generating the at least one value based on one or more additional data objects and a user input indicating an extrapolation function, automatically determining the roll-up value according to the data schema based on the respective values of the first set of data objects and the generated at least one value, and sending, for display in a user interface, the first report including the roll-up value.

A non-transitory computer-readable medium storing code for data analysis is described. The code may include instructions executable by a processor to store, in a database system according to a data schema, a first set of data objects for a tenant of the database system and a second set of data objects corresponding to a set of reports for the tenant, where a first report of the set of reports includes a roll-up value aggregating respective values of the first set of data objects, identify that at least one value of the respective values is not defined in the database system for at least one data object of the first set of data objects, generate the at least one value based on one or more additional data objects and a user input indicating an extrapolation function, automatically determine the roll-up value according to the data schema based on the respective values of the first set of data objects and the generated at least one value, and send, for display in a user interface, the first report including the roll-up value.

In some examples of the method, apparatuses, and non-transitory computer-readable medium described herein, the roll-up value is a first roll-up value and the respective values of the first set of data objects are first respective values of the first set of data objects. Some examples of the method, apparatuses, and non-transitory computer-readable medium described herein may further include operations, features, means, or instructions for automatically determining a second roll-up value for a second report of the set of reports different from the first report according to the data schema based on aggregating second respective values of the first set of data objects.

Some examples of the method, apparatuses, and non-transitory computer-readable medium described herein may further include operations, features, means, or instructions for receiving, at the database system, an additional data object for the tenant, updating the first set of data objects to include the additional data object, and automatically updating the first roll-up value for the first report and the second roll-up value for the second report based on the additional data object.

In some examples of the method, apparatuses, and non-transitory computer-readable medium described herein, the first report is stored in a local memory cache at a user device including the user interface. Some examples of the method, apparatuses, and non-transitory computer-readable medium described herein may further include operations, features, means, or instructions for receiving, at the database system, an additional data object for the tenant, an additional value for a data object of the first set of data objects, or both, automatically updating, in the database system, the roll-up value for the first report based on the additional data object, the additional value, or both, and sending the first report including the automatically updated roll-up value to the user device for storage in the local memory cache and for display in the user interface.

Some examples of the method, apparatuses, and non-transitory computer-readable medium described herein may further include operations, features, means, or instructions for receiving, from the user interface, a second user input refreshing the local memory cache, where the first report including the automatically updated roll-up value may be sent based on the second user input.

In some examples of the method, apparatuses, and non-transitory computer-readable medium described herein, the first report including the automatically updated roll-up value may be automatically sent based on a real time update procedure, a periodic update procedure, a threshold change to the updated roll-up value, or a combination thereof.

In some examples of the method, apparatuses, and non-transitory computer-readable medium described herein, the extrapolation function may be a tenant-specific historical extrapolation function. Some examples of the method, apparatuses, and non-transitory computer-readable medium described herein may further include operations, features, means, or instructions for retrieving, from the database system, the one or more additional data objects, where the one or more additional data objects include previously stored data objects for the tenant.

In some examples of the method, apparatuses, and non-transitory computer-readable medium described herein, the extrapolation function further may include a time window for data object retrieval. In some examples of the method, apparatuses, and non-transitory computer-readable medium described herein, retrieving the one or more additional data objects may include operations, features, means, or instructions for retrieving a subset of data objects stored at the database system for the tenant based on a set of timestamps for the subset of data objects and the time window for data object retrieval.

In some examples of the method, apparatuses, and non-transitory computer-readable medium described herein, the extrapolation function may be a third-party data extrapolation function. Some examples of the method, apparatuses, and non-transitory computer-readable medium described herein may further include operations, features, means, or instructions for determining the at least one value based on the one or more additional data objects from a third-party data source.

In some examples of the method, apparatuses, and non-transitory computer-readable medium described herein, the at least one value includes an industry average value from the third-party data source, a regional average value from the third-party data source, a historical average value from the third-party data source, or a combination thereof.

Some examples of the method, apparatuses, and non-transitory computer-readable medium described herein may further include operations, features, means, or instructions for generating an initial value for the at least one value based on a default extrapolation function and receiving the user input indicating the extrapolation function, where generating the at least one value includes updating the at least one value from the initial value based on receiving the user input.

Some examples of the method, apparatuses, and non-transitory computer-readable medium described herein may further include operations, features, means, or instructions for sending, for display in the user interface, a set of indicators indicating a set of extrapolation functions and receiving, from the user interface, the user input indicating the extrapolation function from the set of extrapolation functions based on the set of indicators.

Some examples of the method, apparatuses, and non-transitory computer-readable medium described herein may further include operations, features, means, or instructions for sending, for display in the user interface, one or more underlying calculations for the extrapolation function, one or more underlying calculations for a field of the first report, or both.

In some examples of the method, apparatuses, and non-transitory computer-readable medium described herein, the user interface displays a subset of fields of the first report based on a user credential.

Some examples of the method, apparatuses, and non-transitory computer-readable medium described herein may further include operations, features, means, or instructions for receiving, from the user interface, a second user input indicating a drill-down selection into a field of the first report and sending, for display in the user interface, one or more data objects of the first set of data objects based on the drill-down selection.

In some examples of the method, apparatuses, and non-transitory computer-readable medium described herein, the user interface displays one or more fields of the first report in a first dashboard. Some examples of the method, apparatuses, and non-transitory computer-readable medium described herein may further include operations, features, means, or instructions for receiving, from the user interface, a second user input indicating a switch to a second dashboard different from the first dashboard and sending, for display in the second dashboard of the user interface, a second report of the set of reports different from the first report based on the second user input.

In some examples of the method, apparatuses, and non-transitory computer-readable medium described herein, the first report may include a set of data quality metrics. Some examples of the method, apparatuses, and non-transitory computer-readable medium described herein may further include operations, features, means, or instructions for receiving, from the user interface, a user credential indicating an auditor, where the first report including the set of data quality metrics may be sent for display in the user interface based on the user credential indicating the auditor.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data analysis, comprising:
   storing, in a database system according to a data schema, a first plurality of data objects for a tenant of the database system and a second plurality of data objects corresponding to a plurality of reports for the tenant, wherein a first report of the plurality of reports comprises a roll-up value aggregating a first set of respective values of the first plurality of data objects;
   identifying that at least one value of a second set of respective values of the first plurality of data objects is missing from the database system for at least one data object of the first plurality of data objects;
   generating the at least one value of the second set of respective values based at least in part on one or more additional data objects and a user input indicating an extrapolation function;
   creating, in the database system, an extrapolation log data object that comprises a data field storing an indication of the extrapolation function;
   automatically determining the roll-up value according to the data schema based at least in part on the first set of respective values of the first plurality of data objects and the generated at least one value; and
   sending, for display in a user interface, the first report comprising the roll-up value and the indication of the extrapolation function.

2. The method of claim 1, wherein the roll-up value comprises a first roll-up value and the first set of respective values of the first plurality of data objects comprise first respective values of the first plurality of data objects, the method further comprising:
   automatically determining a second roll-up value for a second report of the plurality of reports different from the first report according to the data schema based at least in part on aggregating second respective values of the first plurality of data objects.

3. The method of claim 2, further comprising:
   receiving, at the database system, an additional data object for the tenant;
   updating the first plurality of data objects to include the additional data object; and
   automatically updating the first roll-up value for the first report and the second roll-up value for the second report based at least in part on the additional data object.

4. The method of claim 1, wherein the first report is stored in a local memory cache at a user device comprising the user interface, the method further comprising:
   receiving, at the database system, an additional data object for the tenant, an additional value for a data object of the first plurality of data objects, or both;
   automatically updating, in the database system, the roll-up value for the first report based at least in part on the additional data object, the additional value, or both; and
   sending the first report comprising the automatically updated roll-up value to the user device for storage in the local memory cache and for display in the user interface.

5. The method of claim 4, further comprising:
   receiving, from the user interface, a second user input refreshing the local memory cache, wherein the first report comprising the automatically updated roll-up value is sent based at least in part on the second user input.

6. The method of claim 4, wherein the first report comprising the automatically updated roll-up value is automatically sent based at least in part on a real time update procedure, a periodic update procedure, a threshold change to the automatically updated roll-up value, or a combination thereof.

7. The method of claim 1, wherein the extrapolation function comprises a tenant-specific historical extrapolation function, the method further comprising:
   retrieving, from the database system, the one or more additional data objects, wherein the one or more additional data objects comprise previously stored data objects for the tenant.

8. The method of claim 7, wherein the extrapolation function further comprises a time window for data object retrieval and wherein retrieving the one or more additional data objects comprises:
   retrieving a subset of data objects stored at the database system for the tenant based at least in part on a plurality of timestamps for the subset of data objects and the time window for data object retrieval.

9. The method of claim 1, wherein the extrapolation function comprises a third-party data extrapolation function, the method further comprising:
   determining the at least one value based at least in part on the one or more additional data objects from a third-party data source.

10. The method of claim 9, wherein the at least one value comprises an industry average value from the third-party data source, a regional average value from the third-party data source, a historical average value from the third-party data source, or a combination thereof.

11. The method of claim 1, further comprising:
generating an initial value for the at least one value based at least in part on a default extrapolation function; and
receiving the user input indicating the extrapolation function, wherein generating the at least one value comprises updating the at least one value from the initial value based at least in part on receiving the user input.

12. The method of claim 1, further comprising:
sending, for display in the user interface, a plurality of indicators indicating a plurality of extrapolation functions; and
receiving, from the user interface, the user input indicating the extrapolation function from the plurality of extrapolation functions based at least in part on the plurality of indicators.

13. The method of claim 1, further comprising:
sending, for display in the user interface, one or more underlying calculations for the extrapolation function, one or more underlying calculations for a field of the first report, or both.

14. The method of claim 1, wherein the user interface displays a subset of fields of the first report based at least in part on a user credential.

15. The method of claim 1, further comprising:
receiving, from the user interface, a second user input indicating a drill-down selection into a field of the first report; and
sending, for display in the user interface, one or more data objects of the first plurality of data objects based at least in part on the drill-down selection.

16. The method of claim 1, wherein the user interface displays one or more fields of the first report in a first dashboard, the method further comprising:
receiving, from the user interface, a second user input indicating a switch to a second dashboard different from the first dashboard; and
sending, for display in the second dashboard of the user interface, a second report of the plurality of reports different from the first report based at least in part on the second user input.

17. The method of claim 1, wherein the first report comprises a set of data quality metrics, the method further comprising:
receiving, from the user interface, a user credential associated with an audit of the database system, wherein the first report comprising the set of data quality metrics is sent for display in the user interface based at least in part on the user credential associated with the audit of the database system.

18. An apparatus for data analysis, comprising: a processor; memory coupled with the processor; and instructions stored in the memory and executable by the processor to cause the apparatus to:
store, in a database system according to a data schema, a first plurality of data objects for a tenant of the database system and a second plurality of data objects corresponding to a plurality of reports for the tenant, wherein a first report of the plurality of reports comprises a roll-up value aggregating a first set of respective values of the first plurality of data objects;
identify that at least one value of a second set of respective values of the first plurality of data objects is missing from the database system for at least one data object of the first plurality of data objects;
generate the at least one value of the second set of respective values based at least in part on one or more additional data objects and a user input indicating an extrapolation function;
create, in the database system, an extrapolation log data object that comprises a data field storing an indication of the extrapolation function;
automatically determine the roll-up value according to the data schema based at least in part on the first set of respective values of the first plurality of data objects and the generated at least one value; and
send, for display in a user interface, the first report comprising the roll-up value and the indication of the extrapolation function.

19. The apparatus of claim 18, wherein the roll-up value comprises a first roll-up value and the first set of respective values of the first plurality of data objects comprise first respective values of the first plurality of data objects, and the instructions are further executable by the processor to cause the apparatus to:
automatically determine a second roll-up value for a second report of the plurality of reports different from the first report according to the data schema based at least in part on aggregating second respective values of the first plurality of data objects.

20. A non-transitory computer-readable medium storing code for data analysis, the code comprising instructions executable by a processor to:
store, in a database system according to a data schema, a first plurality of data objects for a tenant of the database system and a second plurality of data objects corresponding to a plurality of reports for the tenant, wherein a first report of the plurality of reports comprises a roll-up value aggregating a first set of respective values of the first plurality of data objects;
identify that at least one value of a second set of respective values of the first plurality of data objects is missing from the database system for at least one data object of the first plurality of data objects;
generate the at least one value of the second set of respective values based at least in part on one or more additional data objects and a user input indicating an extrapolation function;
create, in the database system, an extrapolation log data object that comprises a data field storing an indication of the extrapolation function;
automatically determine the roll-up value according to the data schema based at least in part on the first set of respective values of the first plurality of data objects and the generated at least one value; and
send, for display in a user interface, the first report comprising the roll-up value and the indication of the extrapolation function.

* * * * *